US012668295B2

(12) United States Patent
Lawther et al.

(10) Patent No.: US 12,668,295 B2
(45) Date of Patent: Jun. 30, 2026

(54) METHODS AND APPARATUS FOR RETAINING A STEERING SHAFT

(71) Applicant: Ford Global Technologies, LLC, Dearborn, MI (US)

(72) Inventors: Robin Ivo Lawther, Chelmsford (GB); Christopher Hawkins, Hornchurch (GB); Humberto Mata, Dearborn, MI (US); Erik William Soderlind, Harrison Township, MI (US); Eric Schaus, Morgantown, PA (US); Todd Putnam, South Lyon, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/204,178

(22) Filed: May 9, 2025

(65) Prior Publication Data

US 2025/0263106 A1 Aug. 21, 2025

Related U.S. Application Data

(63) Continuation of application No. 18/313,884, filed on May 8, 2023, now Pat. No. 12,311,997.

(51) Int. Cl.
*B62D 1/16* (2006.01)
(52) U.S. Cl.
CPC ...................................... *B62D 1/16* (2013.01)
(58) Field of Classification Search
CPC ........ B62D 1/16; B62D 1/20; B60K 2360/84; B60R 13/0846
See application file for complete search history.

(56) References Cited

U.S. PATENT DOCUMENTS

| | | | |
|---|---|---|---|
| 5,902,186 A | 5/1999 | Gaukel | |
| 7,363,785 B2 | 4/2008 | Limburg et al. | |
| 8,955,407 B2 | 2/2015 | Sakuma | |
| 2014/0084629 A1 | 3/2014 | Atsumi | |
| 2014/0246557 A1* | 9/2014 | Roach ...................... | B62D 1/02 248/560 |

(Continued)

FOREIGN PATENT DOCUMENTS

| | | | |
|---|---|---|---|
| CN | 202847794 U | 4/2013 | |
| DE | 102010012912 A1 * | 10/2010 | ............... B62D 1/16 |

OTHER PUBLICATIONS

Kirchner et al., Mounting device for fixing motor vehicle steering column, comprises steering shaft and sealing sleeve which surrounds steering shaft in front wall of motor vehicle body shell between foot area and engine side, Oct. 21, 2010, EPO, DE 10 2010 012 912 A1, Machine Translation of Description (Year: 2010).*

(Continued)

*Primary Examiner* — James A English
(74) *Attorney, Agent, or Firm* — Hanley, Flight & Zimmerman, LLC

(57) ABSTRACT

Systems, apparatus, articles of manufacture, and methods are disclosed for retaining a steering shaft are disclosed herein. An example apparatus disclosed herein includes a seal, a steering shaft extending through the seal, and means for retaining the steering shaft in a retained position relative to the seal, the means for retaining configured to be release the steering shaft to an assembled position.

20 Claims, 14 Drawing Sheets

(56)  References Cited

U.S. PATENT DOCUMENTS

| | | | |
|---|---|---|---|
| 2015/0197286 A1 | 7/2015 | Barthlow | |
| 2019/0101213 A1 | 4/2019 | Walser | |
| 2020/0307671 A1* | 10/2020 | Ishikawa | F16D 3/84 |
| 2021/0086817 A1 | 3/2021 | Klinger | |

OTHER PUBLICATIONS

United States Patent and Trademark Office, "Requirement for Restriction / Election," issued in connection with U.S. Appl. No. 18/313,884, dated Feb. 23, 2024, 6 pages.

United States Patent and Trademark Office, "Non-Final Rejection," issued in connection with U.S. Appl. No. 18/313,884, dated Jun. 18, 2024, 7 pages.

United States Patent and Trademark Office, "Final Office Action," issued in connection with U.S. Appl. No. 18/313,884, dated Nov. 7, 2024, 8 pages.

United States Patent and Trademark Office, "Advisory Action," issued in connection with U.S. Appl. No. 18/313,884, dated Dec. 30, 2024, 3 pages.

United States Patent and Trademark Office, "Notice of Allowance and Fee(s) Due," issued in connection with U.S. Appl. No. 18/313,884, dated Jan. 31, 2025, 8 pages.

* cited by examiner

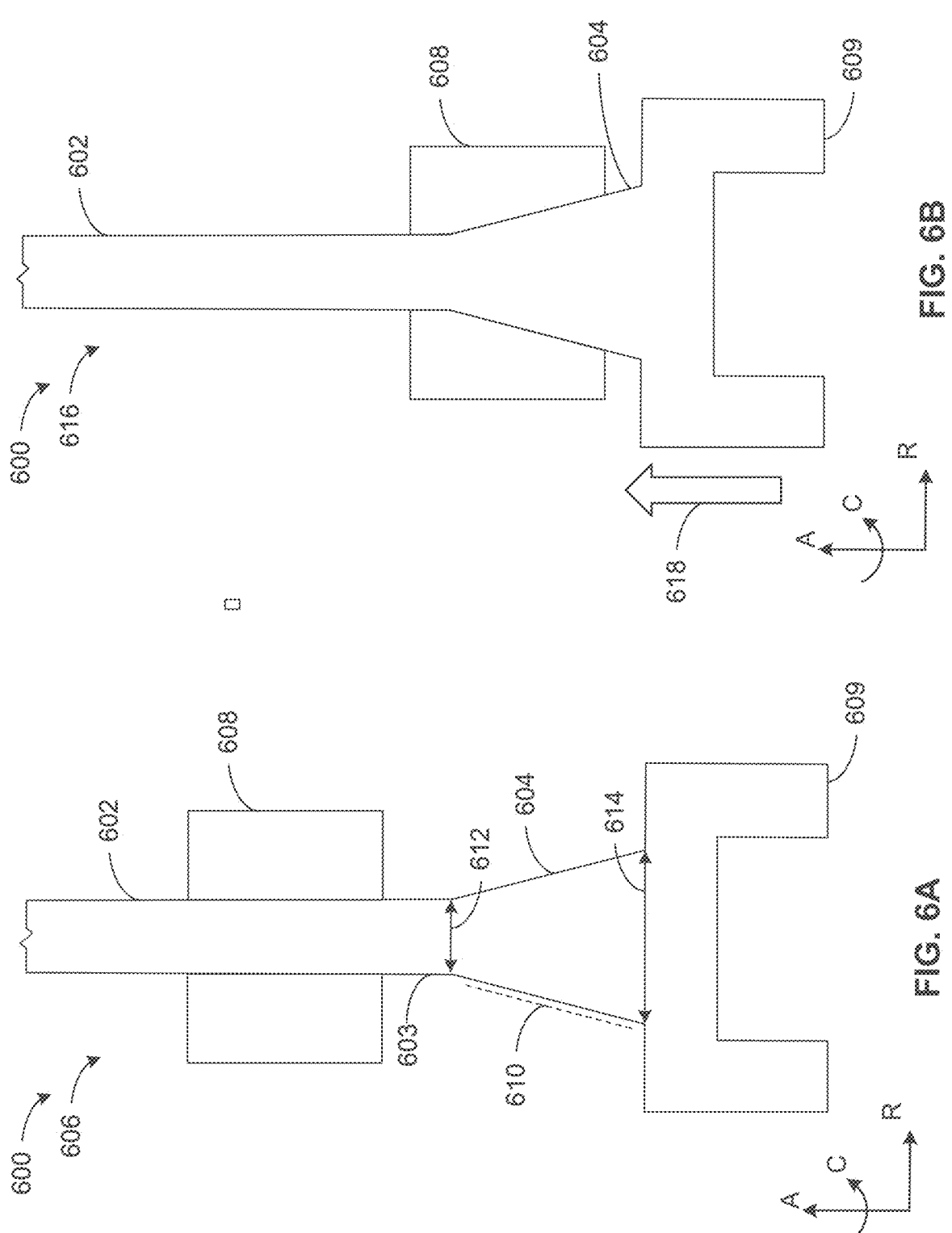

METHODS AND APPARATUS FOR RETAINING A STEERING SHAFT

RELATED APPLICATION

This patent arises from a continuation of U.S. patent application Ser. No. 18/313,884, filed on May 8, 2023, which is incorporated herein by reference in its entirety.

FIELD OF THE DISCLOSURE

This disclosure relates generally to vehicle steering systems and, more particularly, to methods and apparatus for retaining a steering shaft.

BACKGROUND

Vehicle steering systems allow users to turn the wheels of a vehicle using a steering input, such as a steering wheel. In many steering systems, the steering wheel is coupled to a steering shaft assembly, which transmits driver inputs to a steering gear. Steering gears, such as rack and pinion systems, adjust the position of the vehicle wheels based on the user input, which changes the direction of the vehicle. Steering shaft assemblies can include multiple shafts and joints between the steering wheel and steering gear.

SUMMARY

An example apparatus disclosed herein includes a seal, a steering shaft extending through the seal, and means for retaining the steering shaft in a retained position relative to the seal, the means for retaining configured to be release the steering shaft to an assembled position.

An example vehicle disclosed herein including a first compartment, a second compartment, a panel separating the first compartment from the second compartment, and an assembly including at least one retention feature, a seal coupled within a hole of the panel, and a steering shaft extending through the seal, the steering shaft movable between a first position relative to the seal and a second position relative to the seal, the steering shaft retainable in the first position via the at least one retention feature, the first position having a first length of the steering shaft in the first compartment, the second position having a second length in the second compartment, the first length different that the second length.

BRIEF DESCRIPTION OF THE DRAWINGS

FIG. 6A is a schematic view of a steering shaft including an example tapered outer diameter implemented in accordance with the teachings of this disclosure.

FIG. 6B is a schematic view of the shaft of FIG. 6A in a retained position.

Figure 1:
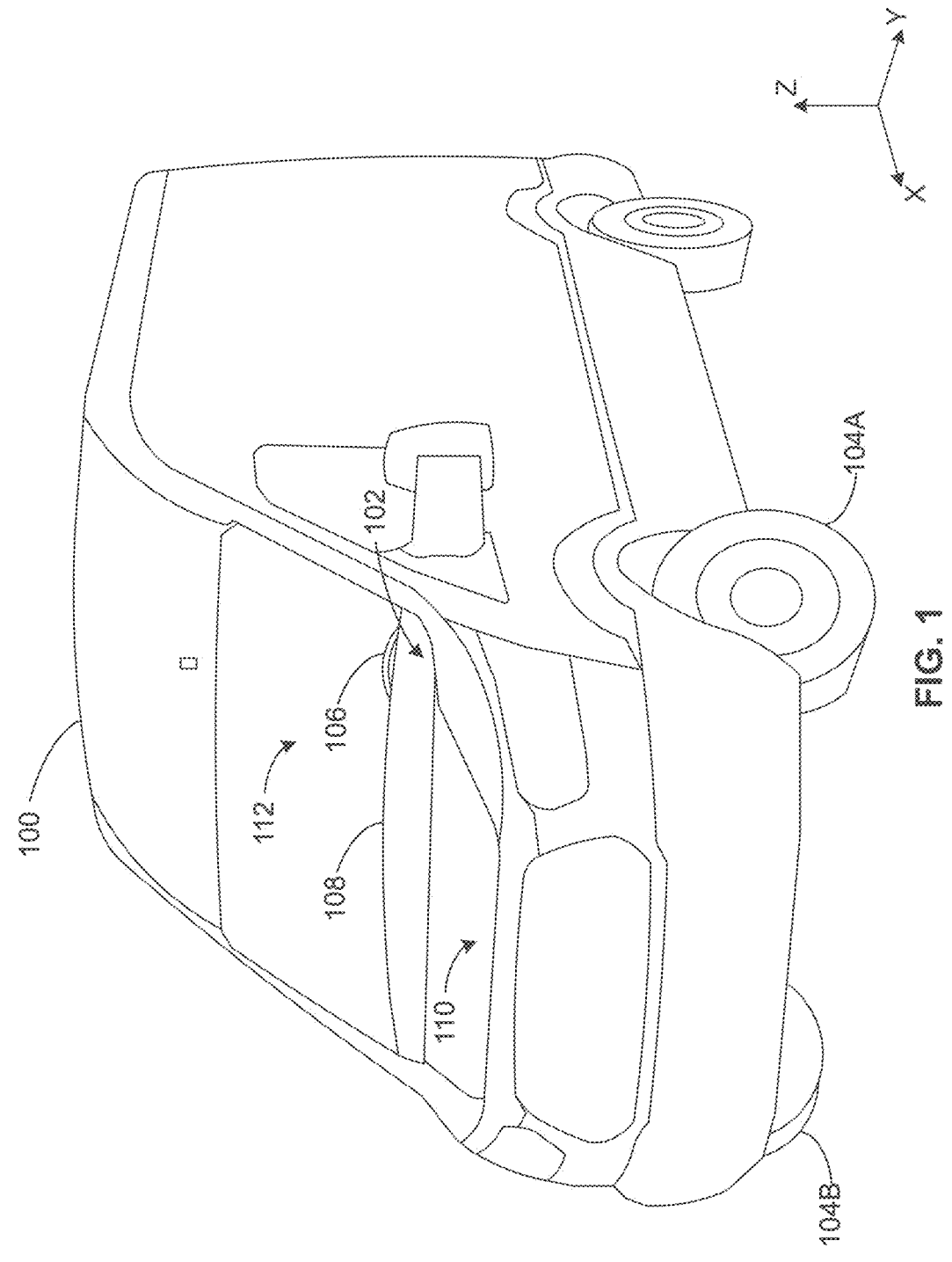
FIG. 1 illustrates an example vehicle in which the teachings of this disclosure can be implemented.

In general, the same reference numbers will be used throughout the drawing(s) and accompanying written description to refer to the same or like parts. The figures are not necessarily to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular.

DETAILED DESCRIPTION

Vehicle steering systems include components that are disposed within the cabin compartment of the vehicle (e.g., the steering wheel, parts of the steering column, etc.) and components that are disposed within the front component compartment of the vehicle (e.g., the steering gear, the linkage arms, power steering components, etc.). In many vehicle configurations, the vehicle cabin compartment is separated from the front component compartment by a dash panel and floor panel, which are typically part of the body of the vehicle. In some such vehicle configurations, a component of the steering system (e.g., a steering shaft, etc.) passes through the dash panel (e.g., via a dash seal, etc.) and/or the floor of the vehicle (e.g., via a floor seal, etc.). During the assembly of such vehicles, the cabin-side components of the steering system, including one or more steering shafts, can be coupled to the dash panel and/or floor panel prior to being coupled to the other components of the steering system. After these components have been assembled, the steering gear is coupled to other components of the steering assembly (also referred herein to as "decking the steering gear") by coupling a universal joint of a steering shaft to a corresponding input shaft of the steering gear. However, because the input shaft of the steering gear is disposed within a receiving socket of the universal joint, the steering gear must be coupled to the universal joint via a vertical motion to prevent the input shaft from contacting the outer surface of the universal joint. Configuring a vehicle assembly line to support such a decking of the steering gear can be costly and/or require a large amount of additional assembly line space.

Examples disclosed herein enable the assembly of vehicle steering systems via features that retain the vehicle steering shaft in a retained position relative to a dash seal and/or floor seal. In some examples disclosed herein, after the steering gear has been decked, the steering shaft can be released from the retained position and coupled to the steering gear. Some examples disclosed herein include a steering shaft with a pin and a seal that includes a slot that retains the shaft via a bayonet coupling. Some examples disclosed herein include shafts with tapered diameters that retain the shaft via a releasable press fit with the seal. Some examples disclosed herein include a shaft with a flange that retains the shaft via an interface with a corresponding flange of the seal. Some examples disclosed herein include a removable bracket coupled to the yoke of the universal joint and a corresponding feature of the dash seal. Some examples disclosed herein include an elastic band that maintains the shaft in the retained position. Some examples disclosed herein include a steering shaft with a hole to receive a pin to retain the steering shaft. Examples disclosed herein permit the lateral and/or longitudinal decking of steering gears, which reduces the complexity and cost of steering system assembly.

As used herein, the orientation of some features is described with reference to a lateral axis, a vertical axis, and a longitudinal axis of the vehicle associated with the features. As used herein, the longitudinal axis of the vehicle is parallel to a centerline of the vehicle. The terms "rear" and "front" are used to refer to directions along the longitudinal axis closer to the rear of the vehicle and the front of the vehicle, respectively. As used herein, the vertical axis of the vehicle is perpendicular to the ground on which the vehicle rests. As used herein, unless otherwise stated, the term "above" describes the relationship of two parts relative to Earth and the vertical axis. A first part is above a second part, if the second part has at least one part between Earth and the first part. Likewise, as used herein, a first part is "below" a second part when the first part is closer to the Earth than the second part. As used herein, the lateral axis of the vehicle is perpendicular to the longitudinal and vertical axes and is generally parallel to the axles of the vehicle. Some of the attached figures are annotated with a set of axes including the lateral axis (Y), the longitudinal axis (X), and the vertical axis (Z). As used herein, the terms "longitudinal," is used to refer to directions parallel to the longitudinal axis. As used herein, the terms "lateral" and "horizontal" are used to refer to directions parallel to the lateral axis. As used herein, the terms "vertical" and "normal" are used interchangeably to refer to directions parallel to the vertical axis.

As used herein, the orientation of some features is described with reference to a radial axis, an axial axis, and a circumferential orientation of a shaft associated with the features. As used herein, the axial axis of the shaft is parallel to a centerline of the shaft. As used herein, the radial axis of the shaft is perpendicular to the centerline of the shaft. As used herein, the circumferential direction of the shaft refers to the angular positions relative to the shaft. As used here, the terms "radially," "axially," and "circumferentially" are adjectives used to refer to features associated with the radial axis, the axial axis, and circumferential direction. Some of the attached figures are annotated with a set of axes including the axial axis (A), the radial axis (R), and the circumferential orientation (C).

As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. In some examples used herein, the term "substantially" is used to describe a relationship between two parts that is within three degrees of the stated relationship (e.g., a substantially colinear relationship is within three degrees of being colinear, a substantially perpendicular relationship is within three degrees of being perpendicular, a substantially parallel relationship is within three degrees of being parallel, etc.).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 1 illustrates an example vehicle 100 in which the teachings of this disclosure can be implemented. In the illustrated example of FIG. 1, the vehicle 100 includes an example steering system 102, an example first wheel 104A, and an example second wheel 104B. In the illustrated example of FIG. 1, the example vehicle 100 is a van. In other examples, the vehicle 100 can be any type of vehicle (e.g., a truck, a sports utility vehicle (SUV), a semi-trailer truck, a mini-van a railed vehicle, an all-terrain vehicle (ATV), watercraft, construction equipment, farming equipment, etc.). In the illustrated example of FIG. 1, the vehicle 100 is a two-axle vehicle. In other examples, the vehicle 100 can have additional axles and/or additional wheels. The example vehicle 100 can have a body-on-frame construction and/or a unibody construction.

In the illustrated example of FIG. 1, the steering system 102 includes an example steering wheel 106 to transmit driver inputs to the steering system 102 (e.g. by rotating the steering wheel, etc.). The steering system 102 receives these user inputs via the steering wheel 106, transforms the input into a lateral force via a steering gear, and rotates the wheels 104A, 104B to change the direction of the vehicle 100. In some examples, the steering system 102 can include a power steering system and/or a steering assist system. For example, the steering system 102 can include a hydraulic power steering system, an electric power steering system, and/or an electro-hydraulic power steering system. A portion of the steering system 102 is described below in conjunction with FIGS. 2A and 2B.

In the illustrated example of FIG. 1, the vehicle 100 includes an example dash 108, which separates an example front component compartment 110 of the vehicle 100 from the example cabin compartment 112 of the vehicle 100. In the illustrated example of FIG. 1, the front component compartment 110 includes the powertrain of the vehicle 100, components of the steering system 102 (e.g., the steering linkages, the steering gear, power steering components, components of the drivetrain of the vehicle 100, etc.). In some examples, the front component compartment 110 can be subdivided via body and/or frame components into smaller compartments. In the illustrated example of FIG. 1, the cabin compartment 112 (e.g., the passenger compartment, etc.) includes the space in which an operator and/or passengers of the vehicle 100 can reside and/or cargo can be stored.

Figure 2A:
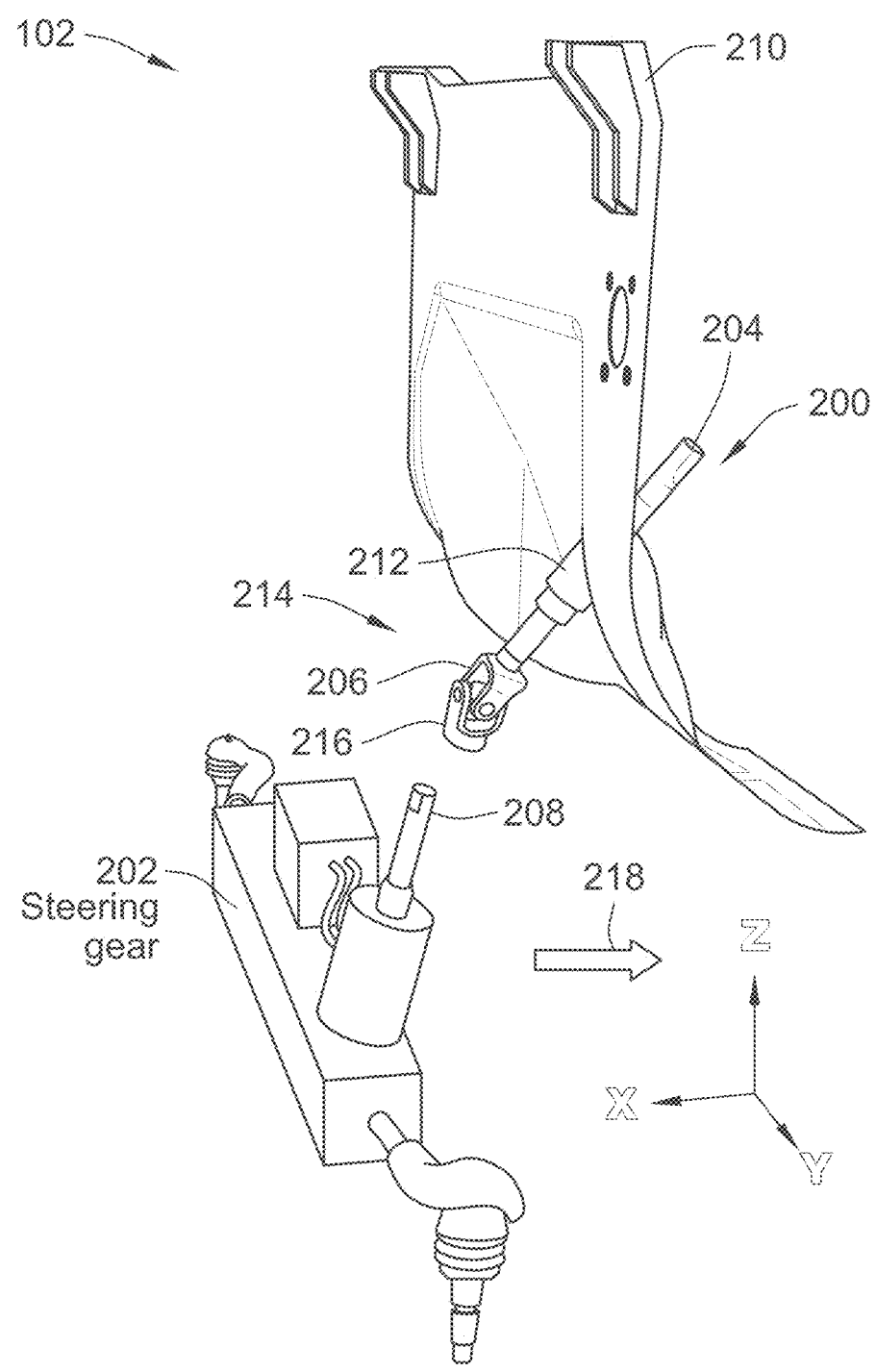
FIG. 2A illustrates an example steering assembly of the vehicle of FIG. 1 in an unassembled position.

FIG. 2A illustrates a portion of the example steering system 102 of the vehicle 100 of FIG. 1 in an unassembled position 200. In the illustrated example of FIG. 2A, the steering system 102 includes an example steering gear 202, an example intermediate shaft 204, an example universal joint (U-joint) 206, and an example input shaft 208. In the illustrated example of FIG. 2A, the intermediate shaft 204 passes through an example dash panel 210 via an example dash seal 212. In the illustrated example of FIG. 2A, the intermediate shaft 204 is in an example retained position 214.

The steering gear 202 is an actuator that receives inputs via the input shaft 208. The steering gear 202 can transform the rotational motion (e.g., caused by the rotation of the steering wheel 106 and/or rotation caused by a steering assist system, etc.) into a lateral force applied to a pitman arm and/or other steering linkages coupled thereto (not illustrated). In some examples, the lateral force output by the steering gear 202 turns the wheels of the vehicle 100 (e.g., the wheels 104A, 104B of FIG. 2, etc.), thus controlling the direction of travel of the vehicle 100. In the illustrated example of FIG. 2A, the steering gear 202 is a rack-and-pinion system. In other examples, the steering gear 202 can be implemented by any other suitable type of steering gear (e.g., a recirculating ball gear system, a worm-and-sector system, etc.).

The intermediate shaft 204 is a steering shaft that transfers rotational motion between a steering column and the input shaft 208 of the steering gear 202. In some examples, an upper end of the intermediate shaft 204 (e.g., the end not coupled to the input shaft 208 via the U-joint 206, etc.) can be coupled to the steering column via another U-joint. In some examples, the steering system 102 can include additional intermediate shafts (e.g., one or more upper intermediate shaft(s), etc.) disposed between the steering column (not illustrated) and the intermediate shaft 204. The U-joint 206 is a coupling that couples the intermediate shaft 204 and the input shaft 208 when the steering system 102 is assembled. The U-joint 206 permits the transfer of rotational motion (e.g., from the steering wheel 106, from a steering assist system, etc.) between the intermediate shaft 204 and the input shaft 208. In the illustrated example of FIG. 2A, the U-joint 206 is a Cardan-type universal joint. In other examples, the U-joint can be implemented by any other suitable type of coupling that permits the transfer of rotational motion between shafts. The U-joint 206 is described in additional detail below in conjunction with FIGS. 3A and 3B.

The dash panel 210 is a structural component of the dash 108 of FIG. 1 that separates a passenger cabin of the vehicle 100 (e.g., the cabin compartment 112 of FIG. 1, etc.) from the front component compartment of the vehicle 100 (e.g., the front component compartment 110 of FIG. 1, etc.). In some examples, the dash panel 210 is a part of the body of the vehicle 100. In other examples, the dash panel 210 is separated from the body of the vehicle 100. In the illustrated example of FIG. 2A, the dash panel 210 is a unitary plate. In other examples, the dash panel 210 can be composed of multiple components.

The dash seal 210 is a bushing that couples the intermediate shaft 204 to the dash panel 210. In the illustrated example of FIG. 2A, the intermediate shaft 204 passes through the dash panel 210 via the dash seal 212. In the illustrated example of FIG. 2A, the dash seal 212 is disposed within an opening (e.g., a hole, etc.) in the dash panel 210. In some examples, the dash seal 212 inhibits the flow of particulate matter (e.g., dirt, etc.), fumes, liquids, etc. between compartments of the vehicle 100 (e.g., the compartments 110, 112 of FIG. 1, etc.). In some examples, the dash seal 212 damps noise and vibration transmitted from the dash panel 210 and the intermediate shaft 204. The dash seal 212 permits the rotation of the intermediate shaft 204 therein, which facilitates the transmission of operator commands between the steering wheel (e.g., the steering wheel 106 of FIG. 1, etc.) and the steering gear 202. In some examples, the dash seal 212 can be composed of rubber. In other examples, the dash seal 212 can be composed of any other suitable elastic component (e.g., plastic, silicone, other synthetic rubbers, etc.). In some examples disclosed herein, the dash seal 212 includes features that enable the intermediate shaft 204 to be retained in the retained position 214. The intermediate shaft 204, the dash seal 212, and the universal joint 206 are described in additional detail below in conjunction with FIGS. 3A and 3B.

Examples disclosed herein are not limited to vehicle configurations in which a steering shaft passes through a dash of the vehicle. For example, examples disclosed herein can also be used in conjunction with vehicle configurations where the intermediate shaft 204 and/or another component of the steering system 102 passes through a floor of the vehicle (e.g., via a floor seal similar to the dash seal 212 of FIGS. 2A, etc.).

In the illustrated example of FIG. 2A, the intermediate shaft 204 is held in the retained position 214. As used herein, the phrase "retained position" refers to a position of a steering shaft during the decking of a steering gear and/or assembly of the steering system, in which the intermediate shaft is slid within the seal to a position vertically above the position the intermediate shaft 204 will have when the steering system 102 is fully assembled. As used herein, the phrases "retained position" and "retracted position" are used interchangeably. The retained position 214 of the intermediate shaft 204 is the position of the intermediate shaft 204 during the decking of the steering gear 202 in the unassembled position 200. The retained position 214 increases the vertical clearance between the universal joint 206 and the input shaft 208, which permits the steering gear 202 to be decked longitudinally via an example longitudinal translation 218, rather than vertically. In the illustrated example of FIG. 2A, because the intermediate shaft 204 is held in the retained position 214, the input shaft 208 is able to move beneath the universal joint 206, which permits the coupling of the input shaft 208 within an example socket 216 of the universal joint 206. If the intermediate shaft 204 was not in the retained position 214, attempting to deck the steering gear 202 via the longitudinal motion 218 would cause contact between the input shaft 208 and an outer surface of the universal joint 206. Example features to hold the intermediate shaft 204 in the retained position 214 are described below in conjunction with FIGS. 4-13.

Figure 2B:
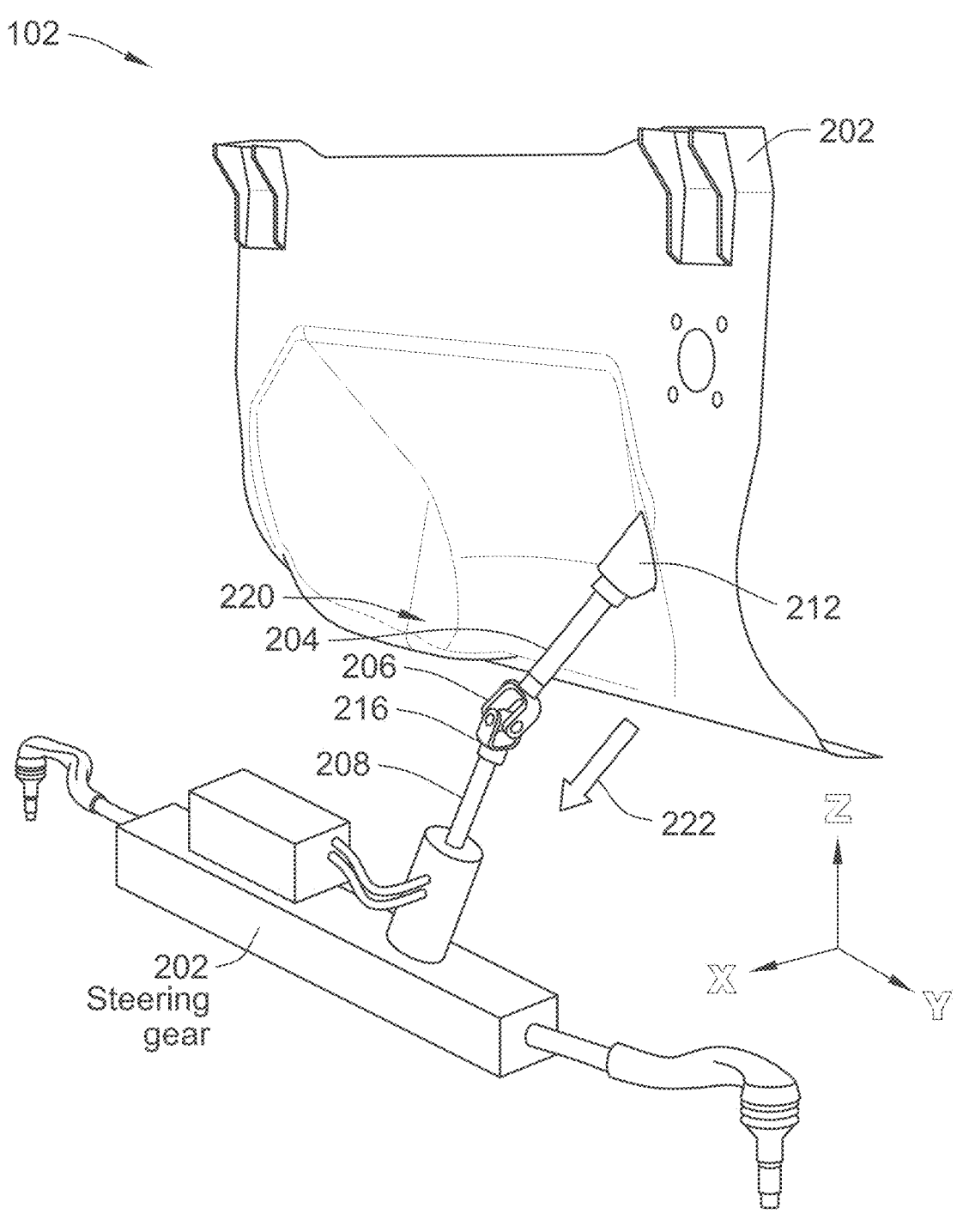
FIG. 2B illustrates an example steering assembly of the vehicle of FIG. 1 in an assembled position.

FIG. 2B illustrates an example steering system 102 of the vehicle 100 of FIG. 1 in an assembled position after the steering gear 202 is decked via the longitudinal motion 218 of FIG. 2A. In the illustrated example of FIG. 2B, the intermediate shaft 204 has been released from the retained position 214 of FIG. 2A into an example deployed position 220 via an example release motion 222. In the illustrated example of FIG. 2B, an end of the input shaft 208 has been disposed within the socket 216 of the U-joint 206, which couples the intermediate shaft 204 to the input shaft 208. As used herein, the term "deployed position" refers to the position of the intermediate shaft 204 after the steering system 102 is fully assembled. The deployed position 220 of the intermediate shaft 204 is the position of the intermediate shaft 204 during the operation of the steering system 102 and the vehicle 100. As used herein, the terms "deployed position" and "assembled position" are used interchangeably.

Figures 3A, 3B:
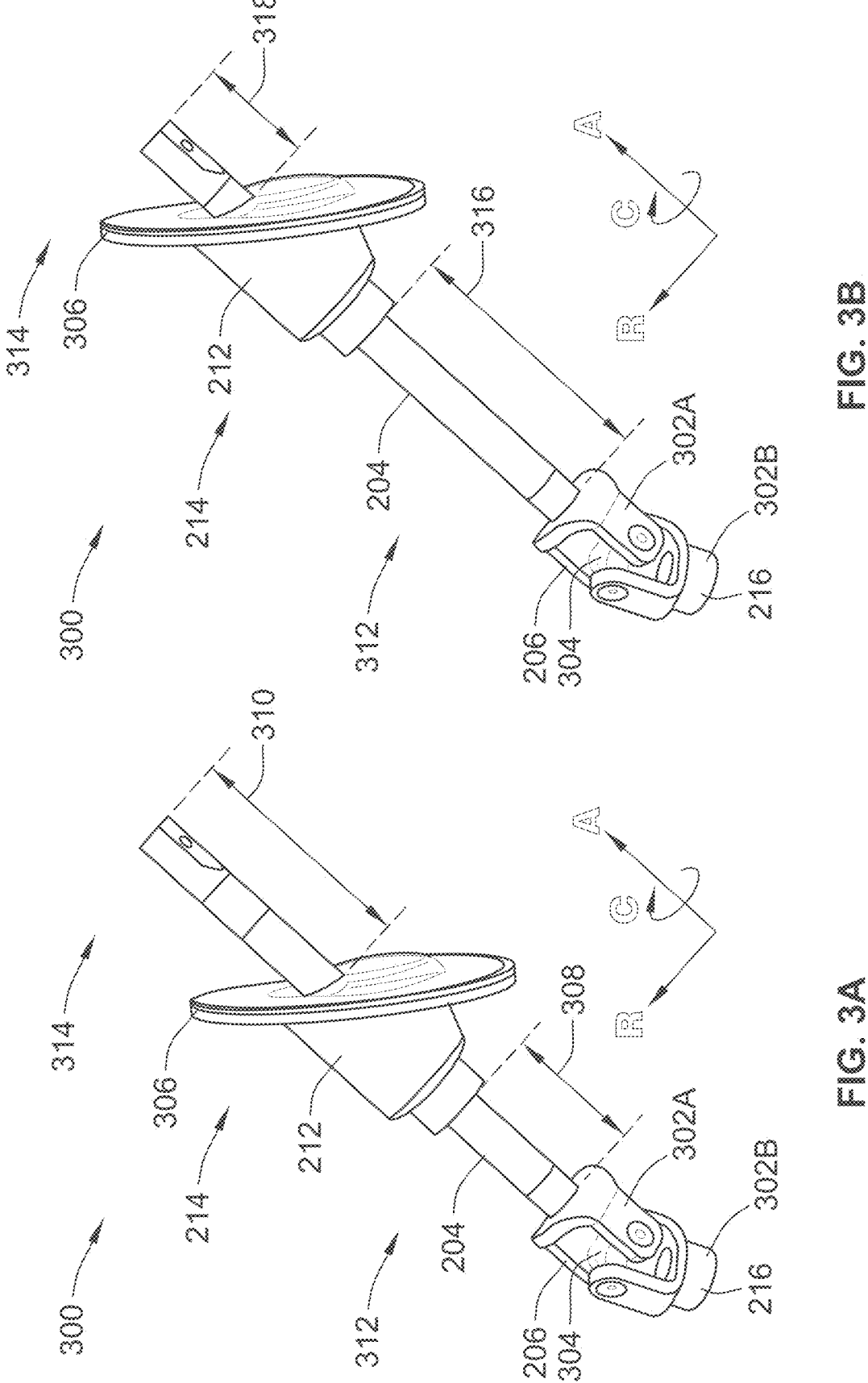
FIG. 3A illustrates an example shaft of FIGS. 2A and 2B in a retained position associated with the unassembled position of FIG. 2A.
FIG. 3B illustrates an example shaft of FIGS. 2A and 2B in a deployed position associated with the assembled position of FIG. 2B.

FIG. 3A illustrates an example assembly 300 including the intermediate shaft 204 of FIGS. 2A and 2B, the U-joint 206 of FIGS. 2A and 2B, and the dash seal 212 of FIGS. 2A and 2B. In the illustrated example of FIG. 3A, the intermediate shaft 204 is in the retained position 214. In the illustrated example of FIG. 3A, the U-joint 206 includes an example first yoke 302A, an example second yoke 302B, and an example ball 304. In the illustrated example of FIG. 3A, the dash seal 212, and the intermediate shaft 204 are disposed in an example lip 306.

The first yoke 302A is disposed at the end of the intermediate shaft 204. In the illustrated example of FIG. 3A, the first yoke 302A is coupled to the intermediate shaft 204 via a weld. In some examples, the first yoke 302A and the intermediate shaft 204 are unitary (e.g., integral, etc.). In other examples, the first yoke 302A can be coupled to via one or more fasteners, one or more press fits, and/or one or more shrink fits. The second yoke 302B includes the socket 216 of FIGS. 2A and 2B. In the illustrated example of FIG. 2A, the first yoke 302A is coupled to the second yoke 302B via the ball 304. In some examples, the ball 304 can be absent. In some such examples, the yokes 302A, 302B can be coupled via a cross shaft. The example lip 306 is the structure that houses the dash seal 212 and enables the coupling of the dash seal 212 within the dash panel 210 of FIGS. 2A and 2B. The lip 306 can be composed of any suitable material, including a metal (e.g., steel, aluminum, etc.) and/or a rigid plastic. In some examples, the lip 306 can be absent. In some such examples, the dash seal 212 can be coupled directly to the dash panel 210.

In the illustrated example of FIG. 3A, in the retained position 214, the intermediate shaft 204 has an example first length 308 and an example second length 310 on an example first side 312 of the dash seal 212 (e.g., the steering gear side, the engine side, the side associate with front compartment side of FIG. 1, etc.) and an example second side 314 of the dash seal 212 (e.g., the steering column side, the steering wheel side, the cabin side, the side associated with the cabin compartment 112 of FIG. 1, etc.), respectively. In the illustrated example of FIG. 3A, the lengths 308, 310 are along the axial axis A. In the illustrated example of FIG. 2, the ratio of the first length 308 to the second length 310 is approximately 0.6. In other examples, the ratio can be any suitable value between 0.3 and 1.5.

FIG. 3B illustrates the example assembly 300 of FIG. 3A, in which the intermediate shaft 204 is in the deployed position 220 of FIG. 2B. In the illustrated example of FIG. 3B, in the deployed position 220, the intermediate shaft 204 has an example third length 316 and an example fourth length 318 on the first side 312 and the second side 314, respectively, along the axial axis A. In the illustrated example of FIG. 3B, the ratio of the first length 308 to the second length 310 is approximately 2.1. In other examples, the ratio can be any suitable value between 1 and 3. In the illustrated example of FIG. 3B, the first length 308 of the intermediate shaft 204 in the retained position 214 is approximately half the length of the third length 316 of the intermediate shaft 204 in the deployed position 220. In other examples, the ratio of the first length 308 and the third length 316 can be any suitable value between 0.25 and 0.75. In the illustrated example of FIG. 3B, the second length 310 of the intermediate shaft 204 in the retained position 214 is approximately twice the fourth length 318 of the intermediate shaft 204 in the deployed position 220. In other examples, the ratio of the second length 310 and the fourth length 318 can be any suitable value between 1.5 and 4.

FIGS. 4-13 include a plurality of features that can be used to retain the intermediate shaft 204 in the retained position 214. The plurality of features disclosed in FIGS. 4-13 can be used independently and/or in combination with other one(s) of the plurality of features disclosed in FIGS. 4-13. When the same element number is used in connection with FIGS. 4-13 as was used in FIGS. 1-3B, it has the same meaning unless indicated otherwise.

Figure 4:
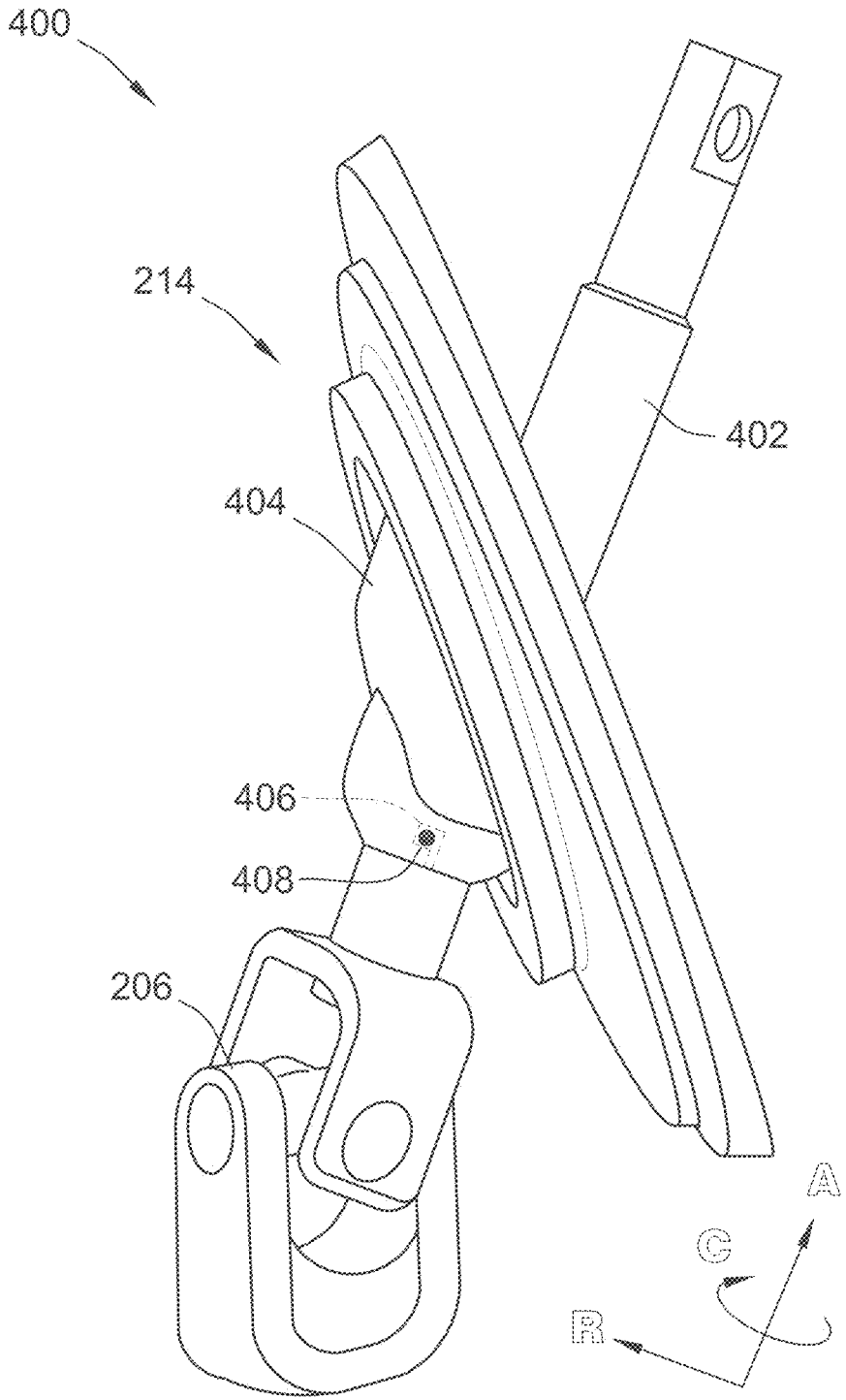
FIG. 4 is a perspective view of a shaft including an example pin and an example retaining slot implemented in accordance with the teachings of this disclosure.

FIG. 4 is a perspective view of an example assembly 400 implemented in accordance with the teachings of this disclosure. In the illustrated example of FIG. 4, the assembly 400 includes an example intermediate shaft 402 and an example dash seal 404. In the illustrated example of FIG. 4, the intermediate shaft 402 includes an example pin 406 and the dash seal 404 includes an example retention slot 408. In the illustrated example of FIG. 4, the assembly 400 is in the example retained position 214 of FIGS. 2A and 3A (e.g., the intermediate shaft 204 is disposed in an elevated vertical position, etc.).

The intermediate shaft 402 is similar to the intermediate shaft 204 of FIGS. 2A-3B, except that the intermediate shaft 402 includes the example pin 406 extending radially from the outer diameter of the intermediate shaft 402. In some examples, the pin 406 can be integral with the shaft 402. In some such examples, the pin 406 and the intermediate shaft 402 can be formed via casting, additive manufacturing, and/or any other suitable manufacturing technique. In other examples, the pin 406 can be coupled to the shaft via one or more welds, one or more fasteners and/or one or more chemical adhesives. Additionally or alternatively, the pin 406 can be coupled to the intermediate shaft 402 via a press fit and/or a shrink fit. In some such examples, a hole can be formed in the intermediate shaft 402 and the pin 406 can be inserted therethrough. In some such examples, the pin 406 can be a through pin (e.g., disposed in a hole that extends through the intermediate shaft 402, etc.). In some such examples, the opposing end of the pin 406 (not illustrated) can be disposed within a corresponding retention slot (not illustrated) formed in a corresponding position within the dash seal 404 (e.g., disposed 180 degrees from the retention slot 408, etc.).

In the illustrated example of FIG. 4, the dash seal 404 is similar to the dash seal 212 of FIGS. 2A-3B, except that the dash seal 404 includes the retention slot 408. In the illustrated example of FIG. 4, the retention slot 408 is formed in the dash seal 404 and extends through the wall of the dash seal 404. In other examples, the retention slot 408 can be a slot disposed within the interior of the dash seal 404 that does not extend to the outer diameter of the dash seal 404.

In the illustrated example of FIG. 4, the retention slot 408 is generally L-shaped and is approximately equal in width to the diameter of the pin 406 to permit the entry of the pin 406 into the retention slot 408. In other examples, the retention slot 408 can be J-shaped, C-shaped, and/or any other suitable shape that retains the pin 406 within the retention slot 408. In the illustrated example of FIG. 4, the retention slot 408 has straight corners (e.g., 90-degree corners, etc.). In other examples, the retention slot 408 can have corners that are chamfered, filleted, and/or any other suitable corner geometry. The retention slot 408 can be formed via negative manufacturing within the dash seal 212 (e.g., via cutting, via machine, etc.). In other examples, the retention slot 408 is formed concurrently with the forming of the dash seal 404 (e.g., during the molding of the dash seal 404, etc.).

In the retained position 214 illustrated in FIG. 4, the pin 406 and the retention slot 408 form a bayonet coupling (e.g., a lightbulb coupling, a bayonet interface, a lightbulb interface, etc.). The coupling and decoupling of the pin 406 and the retention slot 408 are described in additional detail below in conjunction with FIGS. 5A-5C. The example pin 406 and retention slot 408 are means for retaining (e.g., retaining means, etc.) the intermediate shaft 402 in the example retained position 214. Particularly, the engagement (e.g., deposition, etc.) of the pin 406 within the retention slot 408 prevents the intermediate shaft 402 from sliding vertically downward along the axial axis A within the dash seal 404 into a deployed position (e.g., the deployed position 220 of FIGS. 2B and 3B, etc.).

In the illustrated example of FIG. 4, the assembly 400 includes a single pin and a single corresponding retention slot, the pin 406 and the retention slot 408, respectively. In other examples, the assembly 400 can include additional pins and retention slots (e.g., 2 pins and corresponding retention slots, 3 pins and corresponding retention slots, 4 pins and corresponding retention slots, etc.). In some examples, the additional pins can be aligned axially with the pin 406, have a substantially the same width as the pin 406, and have a substantially same radial length as the pin 406. In other examples, the additional pins can be disposed at any other suitable location(s) (e.g., axially displaced from the pin 406, etc.) and/or can have any other suitable widths and/or radial lengths. Similarly, the additional retention slots can be aligned axially with the retention slot 408 and have a same geometry as the retention slot 408. In some such examples, the additional pins can be distributed evenly about the circumference of the intermediate shaft 402 (e.g., spaced evenly in the circumferential direction, etc.). In other examples, the additional pins can be distributed unevenly about the circumference of intermediate shaft 402 (e.g., spaced evenly in the circumferential direction, etc.).

Figure 5A:
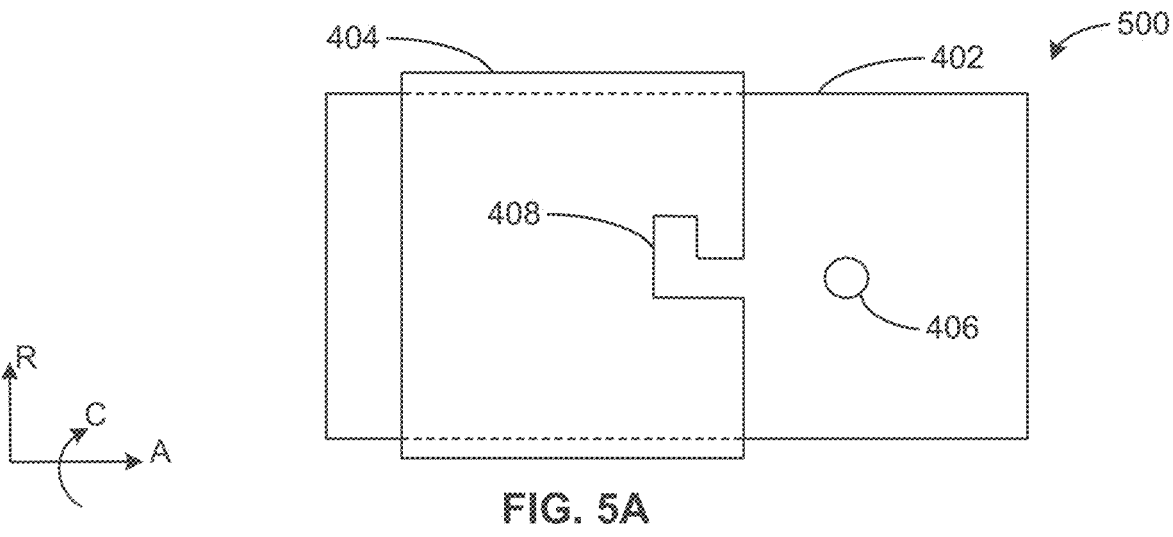
FIGS. 5A-5C are various schematic diagrams depicting an example process for engaging the features of FIG. 4 to retain the shaft of FIGS. 2A-3B.
Figure 5B:
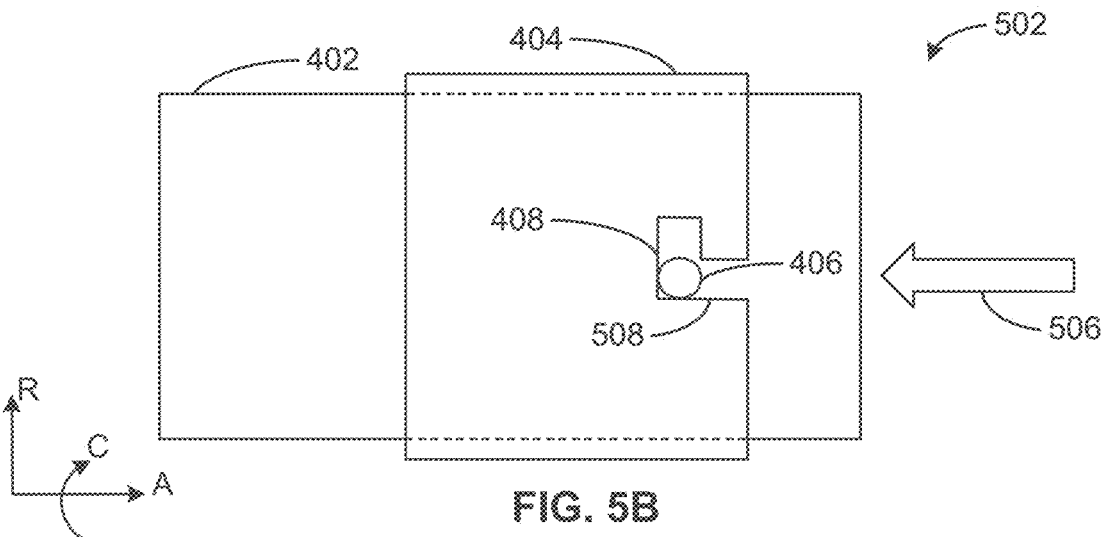
Figure 5C:
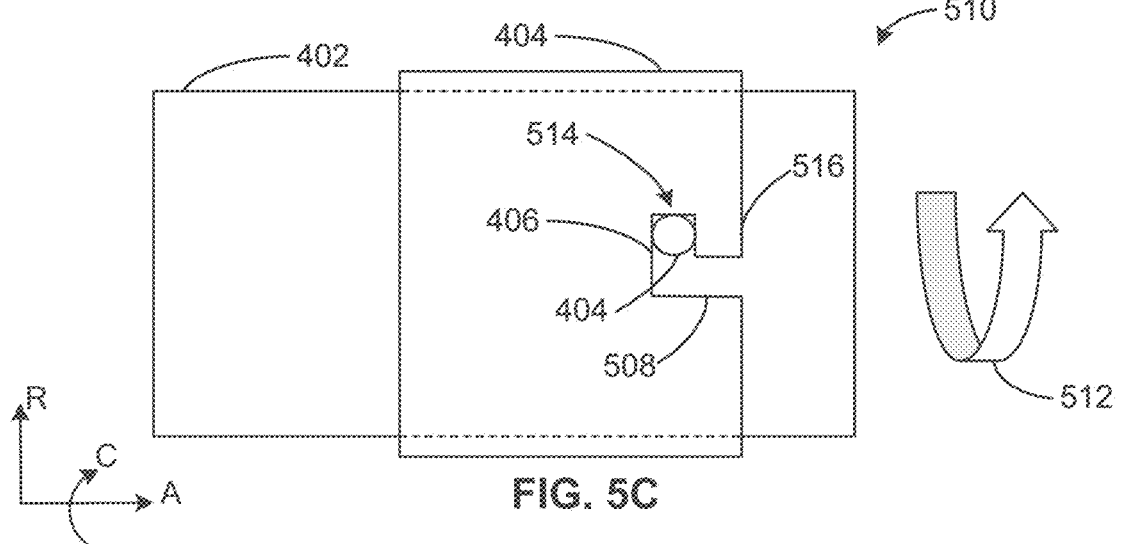

FIGS. 5A-5C are schematic illustrations of the assembly 400 moving from a deployed position (e.g., the deployed position 220 of FIG. 2C, etc.) to the retained position 214 depicted in FIG. 4A. FIGS. 5A-5C include dash lines, which are hidden lines representing portions of the intermediate shaft 402 obscured by the dash seal 404. FIG. 5A is a schematic illustration of the intermediate shaft 402 of FIG. 4, the dash seal 404 of FIG. 4, the pin 406 and the retention slot 408 of FIG. 4 in an example first position 500. The first position 500 corresponds to the deployed position 220 of FIGS. 2B and 3B, in which the pin 406 is not disposed within the retention slot 408.

FIG. 5B is a schematic illustration of the intermediate shaft 402 of FIG. 4, the dash seal 404 of FIG. 4, the pin 406, and the retention slot 408 of FIG. 4 in an example second position 502 following an example axial translation 506. The example axial translation 506 causes the pin 406 to enter an example channel 508 of the retention slot 408. In the illustrated example of FIG. 5A, the pin 406 is axially aligned with the channel 508, which enables the pin 406 to enter the channel 508 via the axial translation 506. In other examples, the pin 406 and the channel 508 of the retention slot 408 are not axially aligned. In the illustrated example of FIG. 5B, the pin 406 and the channel 508 have approximately the same width. In other examples, the channel 508 can be wider than the pin 406.

FIG. 5C is a schematic illustration of the intermediate shaft 402 of FIG. 4, the dash seal 404 of FIG. 4, the pin 406 and the retention slot 408 of FIG. 4 in an example second position 510 following an example rotation 512. The third position 510 corresponds to the retained position 214 of FIGS. 2A and 3A. The example rotation 512 causes the pin 406 to enter an example reservoir 514 of the retention slot 408. In the illustrated example of FIG. 5C, the reservoir 514 is defined by an example lip 516. The lip 516 holds the pin 406 within the reservoir 514, preventing the intermediate shaft 402 from leaving the third position 510, which retains the intermediate shaft 402 and the assembly 400. That is, the lip 516 prevents the intermediate shaft 402 from translating relative to the dash seal 404. In the illustrated example of FIG. 5C, the reservoir 514 is approximately equal in width to the channel 508 and the pin 406. In other examples, the reservoir 514 and the lip 516 can be of any other suitable size.

The intermediate shaft 402 and the assembly 400 can be returned to the first position 500 of FIG. 5A (e.g., the deployed position 200 of FIGS. 2B and 3B, etc.) via a rotation in an opposite direction as the rotation 512 (e.g., a counterclockwise rotation, etc.) Accordingly, the pin 406 and the retention slot 408 enable the intermediate shaft 402 to be moved between the first position 500 of FIG. 5A (e.g., the retained position of FIGS. 2A and 3A, etc.) and the third position 510 of FIG. 5C (e.g., the deployed position 220 of FIGS. 2B and 3B, etc.)

FIG. 6A is a schematic cross-sectional view of an assembly 600 in an example intermediate shaft 602 implemented in accordance with the teachings of this disclosure. In the illustrated example of FIG. 6A, the intermediate shaft 602 includes an example cylindrical portion 603 and an example tapered portion 604. In the illustrated example of FIG. 6A, the assembly 600 is an example first position 606 corresponding to the deployed position 220 of FIGS. 2B and 3B. In the illustrated example of FIG. 6A, the assembly 600 includes an example dash seal 608, similar to the dash seal 212 of FIGS. 2A-3B, and an example yoke 609, similar to the first yoke 302A of FIGS. 3A and 3B.

The intermediate shaft 602 is similar to the intermediate shaft 204 of FIGS. 2A-3B, except that the intermediate shaft 602 includes the tapered portion 604. In the illustrated example of FIG. 6A, the tapered portion 604 has an example tapered profile 610. The cylindrical portion 603 has an example first diameter 612. The tapered profile 610 extends between the cylindrical portion 603 and the yoke 609. The tapered portion 604 has an example second diameter 614 adjacent to the yoke 609. In the illustrated example of FIG. 6A, the tapered portion 604 abuts the first yoke 609. In other examples, the tapered portion 604 can be displaced from the first yoke 609. In some such examples, the intermediate shaft 602 can have the second diameter 614 between the tapered portion 604 and the yoke 609. In other examples, the intermediate shaft 602 can have the first diameter 612 and/or another diameter smaller than the second diameter 614 between the yoke 609 and the end of the tapered portion 604.

FIG. 6B is a schematic view of the assembly 600 of FIG. 6A in an example second position 616 that corresponds to the retained position 214 of FIGS. 2A and 3A. In the illustrated example of FIG. 6B, an example translation 618 has partly disposed the tapered portion 604 within the dash seal 608. In the illustrated example of FIG. 6B, because the dash seal 608 is composed of an elastomer, the tapered profile 610 causes the dash seal 608 to elastically deform and form an interference fit (e.g., press fit, an interference coupling, etc.) with the tapered portion 604. That is, in the illustrated example of FIG. 6B, frictional forces between the dash seal 608 and the tapered portion 604 cause the intermediate shaft 602 to be retained in the second position 616. To release the intermediate shaft 602 from the second position 616, a force can be applied (e.g., by a technician, by a machine, etc.) to the intermediate shaft 602 to overcome the frictional forces associated with the press fit between the dash seal 608 and the tapered portion 604, thereby releasing the press fit between the tapered portion 604 and the dash seal 608. The tapered portion 604 is means for retaining (e.g., retaining means, etc.) the intermediate shaft 602 in the example second position 616 (e.g., a retained position, etc.). Particularly, the frictional force between the tapered portion 604 and dash seal 608 prevents the intermediate shaft 602 from sliding vertically downward within the dash seal 608 into a deployed position (e.g., the deployed position 220 of FIGS. 2B and 3B, etc.). While the examples of FIGS. 6A and 6B illustrate the intermediate shaft 602 with the tapered portion 604 that enables the retention of the intermediate shaft 602 in the first position 606, in other examples, an intermediate shaft can be similarly retained by a dash seal with a tapered surface.

Figures 7A, 7B:
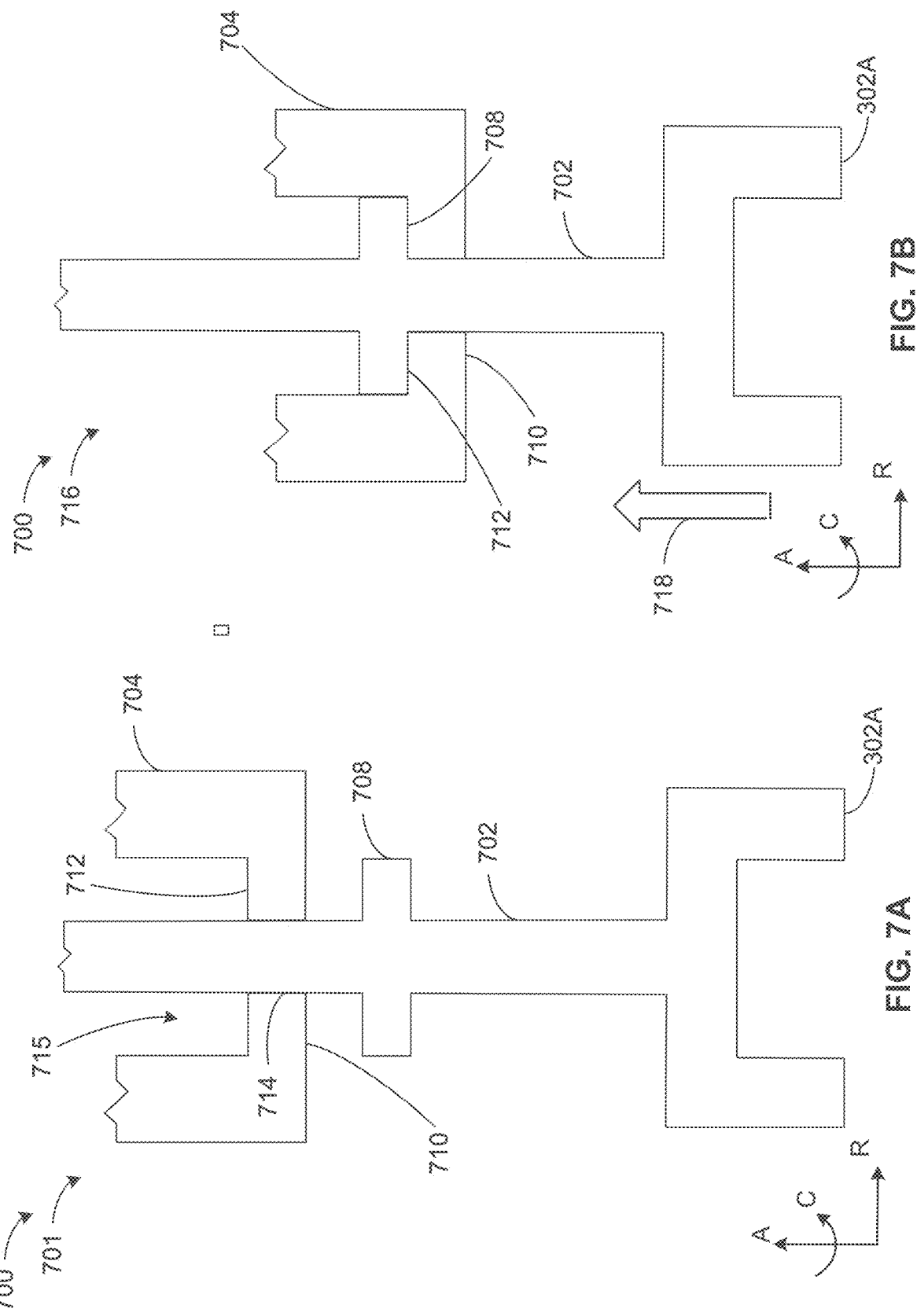
FIG. 7A is a schematic view of a steering shaft including an example flange implemented in accordance with the teachings of this disclosure.
FIG. 7B is a schematic view of the shaft of FIG. 7A in a retained position.

FIG. 7A is a schematic cross-sectional view of an assembly 700 in an example first position 701 implemented in accordance with the teachings of this disclosure. In the illustrated example of FIG. 7A, the assembly 700 includes an example intermediate shaft 702, an example dash seal 704, and the example first yoke 302A of FIGS. 3A and 3B. In the illustrated example of FIG. 7A, the intermediate shaft 702 includes an example first flange 708 and the dash seal 704 includes an example second flange 710.

The intermediate shaft 702 is similar to the intermediate shaft 204 of FIGS. 2A-3B, except that the intermediate shaft 702 includes the first flange 708. In the illustrated example of FIG. 7A, the first flange 708 is an annular (e.g., ring-shaped, etc.) protrusion extending from the outer diameter of the intermediate shaft 702. In some examples, the first flange 708 is continuous about the circumference of the intermediate shaft 702. In other examples, the flange 708 can be composed of multiple segments (e.g., 2 segments, 3 segments, 4 segments, etc.) disposed about the circumference of the intermediate shaft 702 (e.g., evenly distributed, unevenly distributed, etc.). Additionally or alternatively, the flange 708 can be formed via one or more pins extending from the outer diameter of the intermediate shaft 702. In some examples, the first flange 708 can be formed during the formation of the other portions of the intermediate shaft 702 (e.g., via casting, via additive manufacturing, etc.). In other examples, the first flange 708 can be formed via negative manufacturing (e.g., machining, etc.). In other examples, the first flange 708 can be manufactured separately from the intermediate shaft 702 and coupled thereto via one or more welds, one or more press fits, one or more fasteners, one or more shrink fits, one or more chemical adhesives and/or a combination thereof. In some such examples, the first flange 708 can be removed from the intermediate shaft 702 after the decking of the steering gear (e.g., the steering gear 202 of FIG. 2, etc.).

The dash seal 704 is similar to the intermediate shaft 204 of FIGS. 2A-3B, except that the dash seal 704 includes the second flange 710. In the illustrated example of FIG. 7A, the second flange 710 defines an example first surface 712 in a plane perpendicular to the axis of the intermediate shaft 702 and an example second surface 714 that abuts the outer diameter of the intermediate shaft 702. In the illustrated example of FIG. 7A, the second flange 710, the dash seal 704, and the outer diameter of the intermediate shaft 702 define an example cavity 715. In the illustrated example, the cavity 715 is generally ring-shaped. In other examples, the cavity 715 can have any other suitable geometry. The second flange 710 and/or the cavity 715 can be formed in the dash seal 704 via negative manufacturing (e.g., via cutting, via machining, etc.). In other examples, the second flange 710 and/or the cavity 715 are formed concurrently with the forming of the dash seal 704 (e.g., during the molding of the dash seal 704, etc.).

In the illustrated example of FIG. 7A, the second flange 710, and the first surface 712 extend circumferentially around the outer diameter of the intermediate shaft 702. In some examples, the first surface 712 can be complimentary to the geometry of the first flange 708. In other examples, the first surface 712 can have any other suitable geometry. In the illustrated example of FIG. 7A, the second surface 714 abuts the outer diameter of the intermediate shaft 702, which enables the dash seal 704 to act as a bushing for the intermediate shaft 702. In some such examples, the second flange 710 prevents the flow of fluids and gases through the dash seal 704 and/or damps noise and vibration associated with the intermediate shaft 702. In the illustrated example of FIG. 7A, the second surface 714 is the only portion of the dash seal 704 in contact with the intermediate shaft 702. In other examples, the dash seal 704 can include other portions that abut the intermediate shaft 702 (e.g., portions above the cavity 715, etc.).

FIG. 7B is a schematic view of the shaft of FIG. 7A in an example second position 716 that corresponds to the retained position 214 of FIGS. 2A and 3A. In the illustrated example of FIG. 7B, an example translation 718 causes the first flange 708 to abut the first surface 712 of the second flange 710 of the dash seal 704.

In the illustrated example of FIG. 7B, because the dash seal 704 is composed of an elastomer, the translation 718 causes the second flange 710 to elastically deform and/or deflect, which enables the first flange 708 to enter the cavity 715. After the second flange 710 enters the cavity 715, the second flange 710 returns to the initial position, which allows the first flange 708 to abut the first surface 712. The interface between the first flange 708 and the first surface 712 of the second flange 710 retains the assembly in the second position 716. To release the intermediate shaft 702 from the second position 716, a force can be applied (e.g., by a technician, by a machine, etc.) to the intermediate shaft 702 and to increase the force applied by the first flange 708 on the second flange 710, until the second flange 710 elastically deforms and/or deflects and allows the first flange 708 to leave the cavity 715. Additionally or alternatively, a force can be applied directly to the second flange 710 (e.g., via a specialized tool, etc.) to cause the second flange 710 to elastically deform and/or deflect in a manner that enables the first flange 708 to release from the cavity 715.

The flanges 708, 710 are means for retaining (e.g., retaining means, etc.) the intermediate shaft 702 in the example second position 716 (e.g., a retained position, etc.). Particularly, the abutment (e.g., deposition, etc.) of the first flange 708 on the first surface 712 of the second flange 710 prevents the intermediate shaft 702 from sliding vertically downward within the dash seal 704 into a deployed position (e.g., the deployed position 220 of FIGS. 2B and 3B, etc.).

Figure 8:
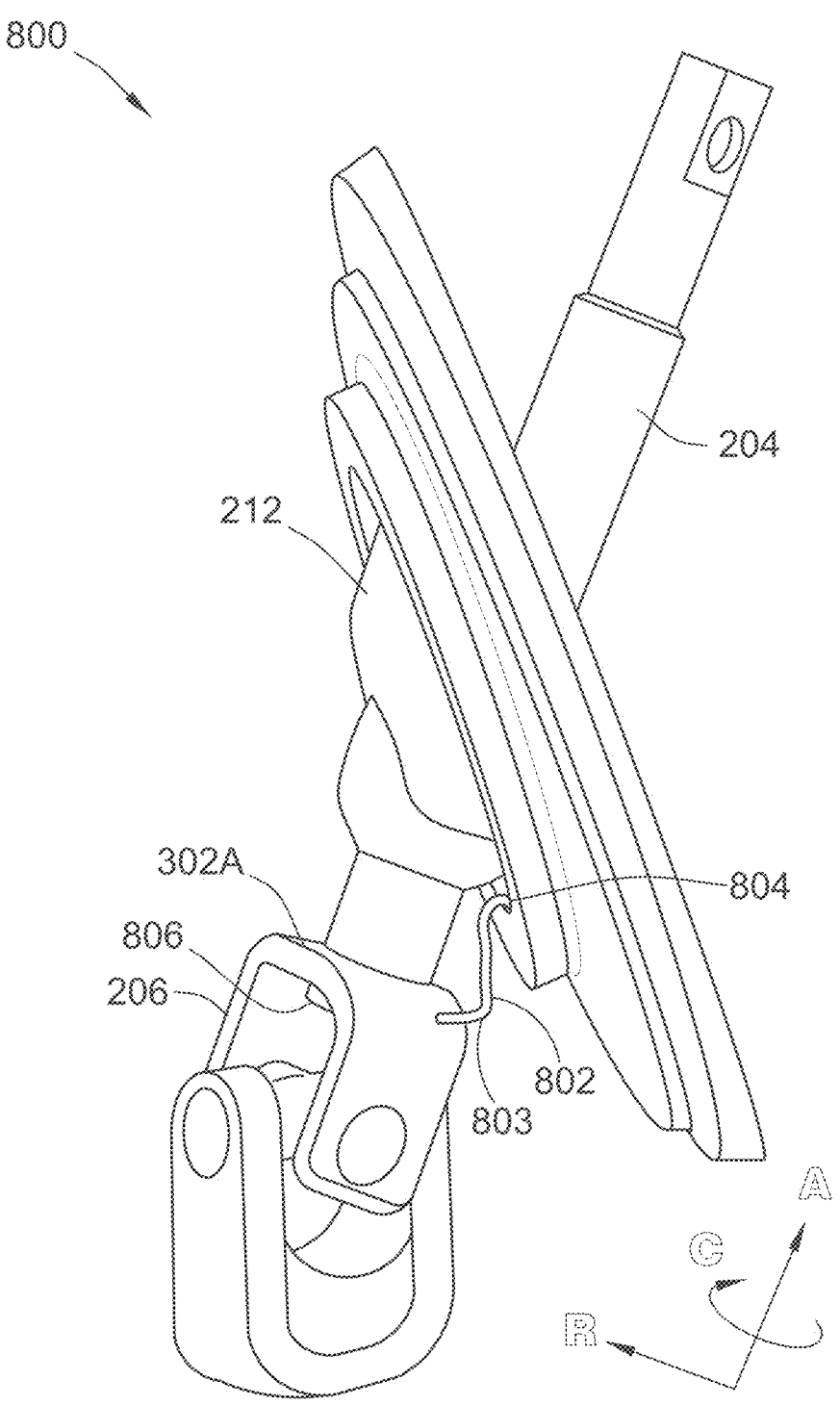
FIG. 8 is a perspective view of another shaft including an example retainer bracket implemented in accordance with the teachings of this disclosure.

FIG. 8 is a perspective view of an assembly 800 including an example retainer bracket 802 implemented in accordance with the teachings of this disclosure. In the illustrated example of FIG. 8, the assembly 800 includes the intermediate shaft 204 of FIGS. 2A-3B, the dash seal 212 of FIGS. 2A-3B, and the U-joint 206 of FIGS. 2A-3B. In the illustrated example of FIG. 8, the assembly 800 and the intermediate shaft 204 are retained in the retained position 214 of FIGS. 2A-3B via the retainer bracket 802. The retainer bracket 802 includes an example first arm 803 and an example second arm 804.

In the illustrated example of FIG. 8, the first arm 803 of the retainer bracket 802 abuts an example inner surface 806 of the first yoke 302A. In the illustrated example of FIG. 8, the inner surface 806 is a planar surface parallel to the radial-circumferential plane of the intermediate shaft 204. In other examples, the inner surface 806 can include a channel, hole, and/or other feature to facilitate the receiving of the first arm 803. In the illustrated example of FIG. 8, the second arm 804 is coupled to the corresponding portion of the dash seal 212. Accordingly, the tensional force carried by the retainer bracket 802 caused by the weight of the intermediate shaft 204, applied at the inner surface 806 on the first arm 803, and reacted at the dash seal 212 retains the assembly 800 and the intermediate shaft 204 in the retained position 214. The retainer bracket 802 is means for retaining (e.g., retaining means, etc.) the intermediate shaft 204 in the example retained position 214.

In the illustrated example of FIG. 8, the retainer bracket 802 is generally S-shaped. In other examples, the retainer bracket 802 can have any other suitable shape. The retainer bracket 802 can be composed of a metal (e.g., steel, aluminum, copper, brass, etc.), a plastic (e.g., polylactic acid, polyethylene, polystyrene, polyvinyl chloride, etc.), a natural material, a composite, etc.). In some examples, the retainer bracket 802 can be manufactured via stamping and bending. In other examples, the retainer bracket 802 can be manufactured via any other suitable manufacturing technique (e.g., machining, additive manufacturing, etc.).

To move the assembly 800 into the retained position 214, the intermediate shaft 204 can be moved towards the second side 314 of the dash seal 212 (e.g., moved by a technician, moved by a tool, etc.). In some such examples, while the intermediate shaft 204 is held in position, the second arm 804 can be coupled to the dash seal 212 and the intermediate shaft 204 can be slid until the first arm 803 abuts the inner surface 806 of the first yoke 802A. Accordingly, in the illustrated example of FIG. 8, the retainer bracket 802 retains the intermediate shaft 204 and the assembly 800 in the retained position 214. To release the assembly 800 from the retained position 214, the retainer bracket 802 can be removed by moving the intermediate shaft 204 further into the second side 314 of FIG. 3A of the dash seal 212, which releases the tensional force applied to the retainer bracket 802 by the weight of the intermediate shaft 204. In some such examples, the retainer bracket 802 can be removed from the assembly 800, and the intermediate shaft 204 can slide within the dash seal 212 into the deployed position 220 of FIGS. 2B and 3B. Additionally or alternatively, the retainer bracket 802 can be severed to release the assembly 800 from the retained position 214.

Figure 9:
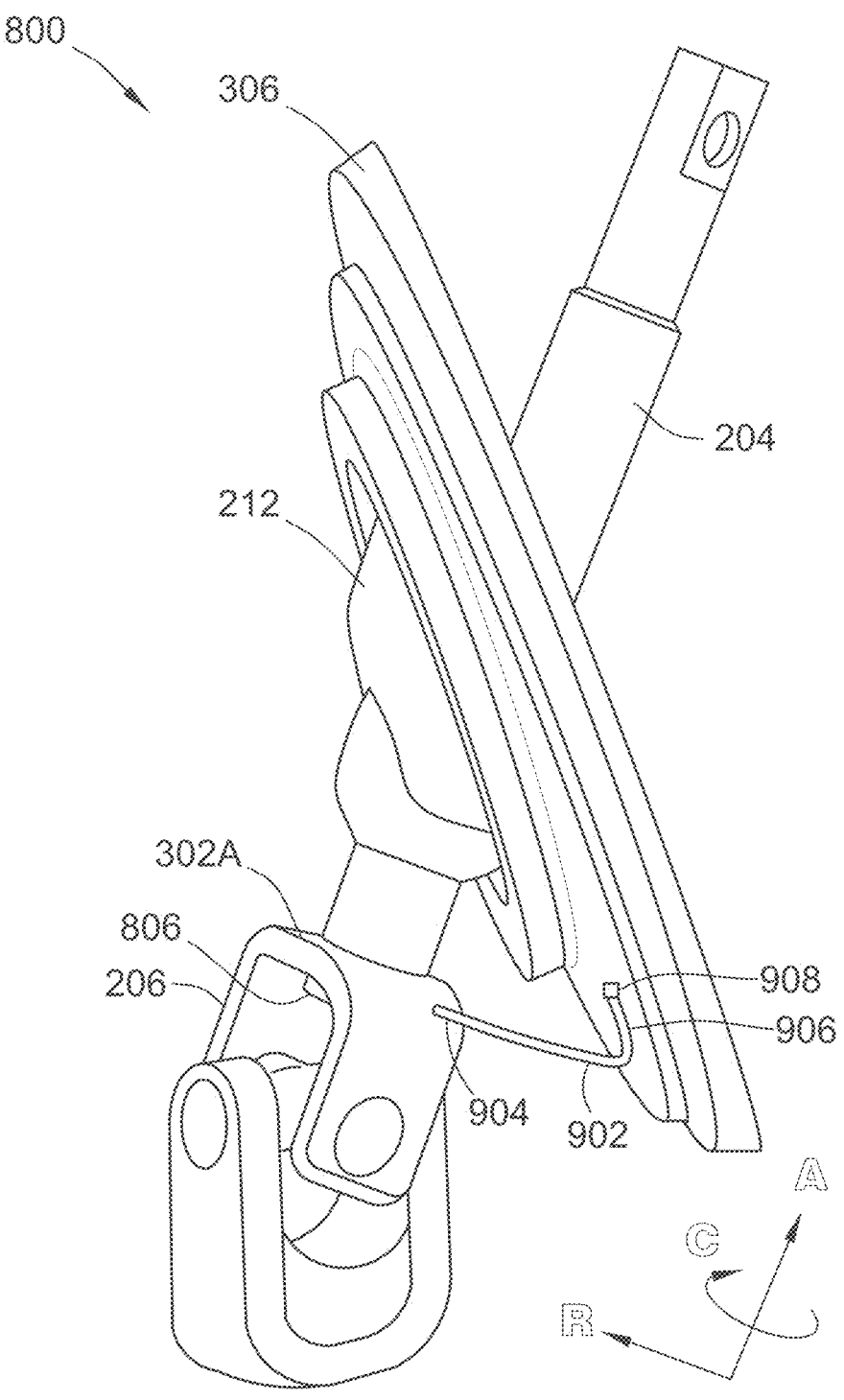
FIG. 9 is a perspective view of another shaft including another example retainer bracket implemented in accordance with the teachings of this disclosure.

FIG. 9 is a perspective view of another example assembly 900 including an example retainer bracket 902 implemented in accordance with the teachings of this disclosure. In the illustrated example of FIG. 9, the assembly 900 includes the intermediate shaft 204 of FIGS. 2A-3B, the dash seal 212 of FIGS. 2A-3B, the U-joint 206 of FIGS. 2A-3B, and the example lip 306 of FIGS. 3A and 3B. In the illustrated example of FIG. 9, the assembly 900 and the intermediate shaft 204 are retained in the retained position 214 of FIGS. 2A-3B via the retainer bracket 902. The retainer bracket 902 includes an example first arm 904 and an example second arm 906. In the illustrated example of FIG. 9, the second arm 906 is retained by an example receiving cavity 908 on the lip 306 of the assembly 900.

In the illustrated example of FIG. 9, the first arm 904 of the retainer bracket 902 abuts the inner surface 806 of the first yoke 302A. In some examples, the first arm 904 can be received by a channel, hole, and/or other feature of the inner surface 806. In other examples, the first arm 904 can flatly abut the inner surface 806. In the illustrated example of FIG. 9, the second arm 906 to an example receiving cavity 908 of the lip 306. In some examples, the receiving cavity 908 can be a hole through the lip 306. In other examples, the receiving cavity 908 can be formed via an extrusion on the first side 314 of the dash seal 212. Accordingly, the tensional force carried by the retainer bracket 902 caused by the weight of the intermediate shaft 204, applied at the inner surface 806 on the first arm 904, and reacted at the dash seal 212 retains the assembly 900 and the intermediate shaft 204 in the retained position 214. The retainer bracket 902 is means for retaining (e.g., retaining means, etc.) the intermediate shaft 204 in the example retained position 214.

In the illustrated example of FIG. 9, the retainer bracket 902 is generally U-shaped. In other examples, the retainer bracket 902 can have any other suitable shape. The retainer bracket 902 can be composed of a metal (e.g., steel, aluminum, copper, brass, etc.), a polymer (e.g., polylactic acid, polyethylene, polystyrene, polyvinyl chloride, etc.), a natural material, a composite, etc.). In some examples, the retainer bracket 902 can be manufactured via stamping and bending. In other examples, the retainer bracket 902 can be manufactured via any other suitable manufacturing technique (e.g., machining, additive manufacturing, etc.).

To move the assembly 900 into the retained position 214, the intermediate shaft 204 can be moved towards the second side 314 of the dash seal 212 (e.g., moved by a technician, moved by a tool, etc.). In some such examples, while the intermediate shaft 204 is held in position, the second arm 906 can be coupled to the dash seal 212, and the intermediate shaft 204 can be slid until the first arm 904 abuts the inner surface 806 of the first yoke 302A. Accordingly, in the illustrated example of FIG. 9, the retainer bracket 902 retains the intermediate shaft 204, and the assembly 900 in the retained position 214. To release the assembly 900 from the retained position 214, the retainer bracket 902 can be removed by moving the intermediate shaft 204 further into the second side 314 of FIG. 3A of the dash seal 212, which relies on the tensional force applied to the retainer bracket 902 by the weight of the intermediate shaft 204. In some such examples, the retainer bracket 902 can be removed from the assembly 900 and the intermediate shaft 204 can slide within the dash seal 212 into the deployed position 220 of FIGS. 2B and 3B.

Figure 10:
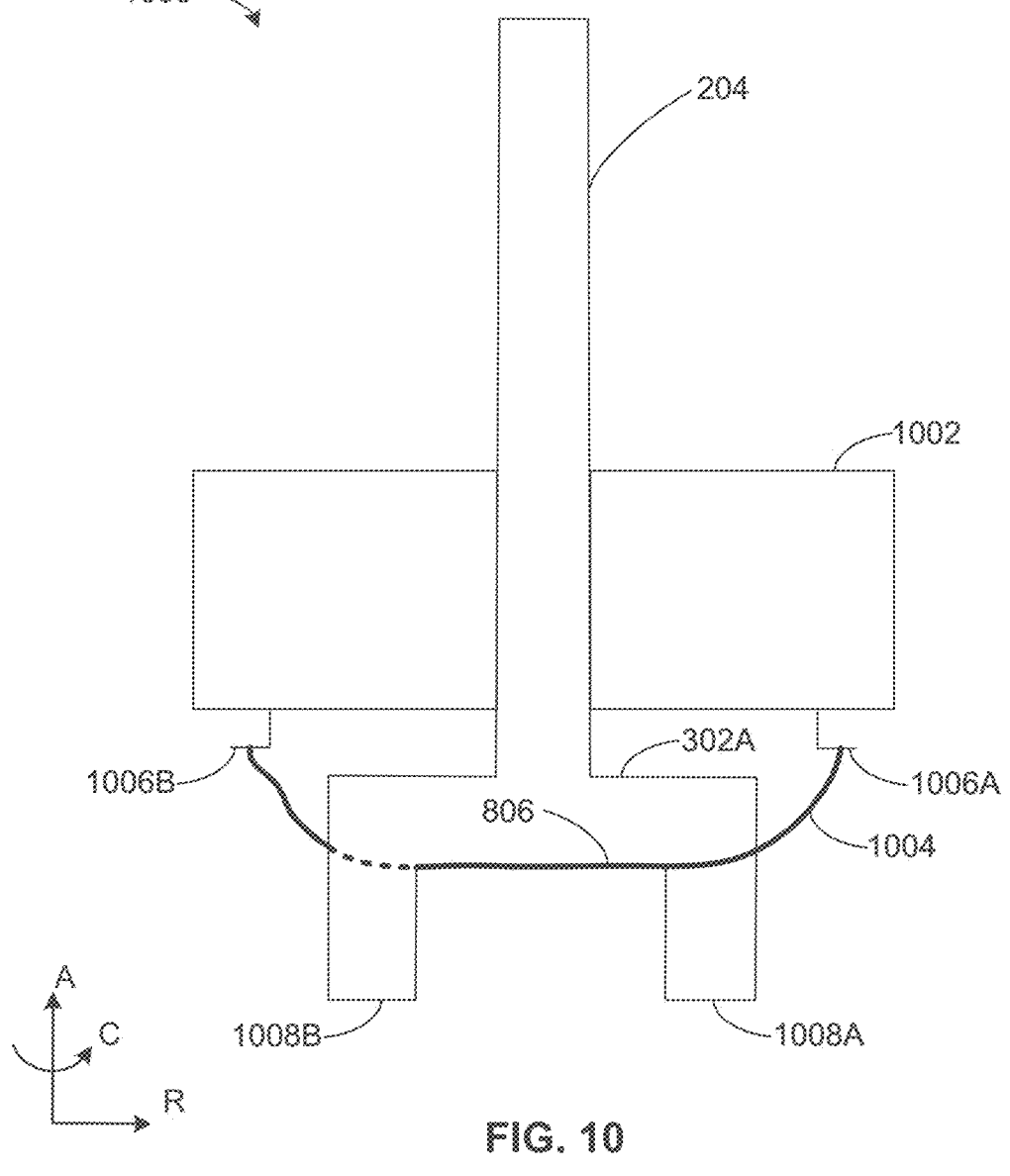
FIG. 10 is a schematic view of a steering shaft including a flexible member in a first configuration implemented in accordance with the teachings of this disclosure.

FIG. 10 is a schematic view of another example assembly 1000 including the intermediate shaft 204 of FIGS. 2A-3B, an example first yoke 302A of FIGS. 3A-3B, an example dash seal 1002, and an example flexible member 1004. In the illustrated example of FIG. 10, the example flexible member 1004 is coupled to an example first tang 1006A and an example second tang 1006B. The flexible member 1004 is a bendable feature that extends between the tangs 1006A, 1006B. The flexible member 1004 can be composed of one or more plastics (e.g., nylon, polyester, polypropylene, etc.), one or more natural fibers (e.g., cotton, wool, hemp, jute, etc.), one or more elastomers (e.g., rubber, etc.), and/or any other suitable materials. The example flexible member 1004 can be manufactured via weaving, extrusion, and/or any other suitable manner. In some examples, the flexible member 1004 can be a band (e.g., a closed loop member, etc.). In other examples, the flexible member 1004 can be a discrete non-looped segment (e.g., a string, a rope, etc.).

The tangs 1006A, 1006B are rigid members that are coupled to the dash seal 1002. The tangs 1006A, 1006B are an interface (e.g., a stake, a pin, a rod, etc.) to which corresponding ends of the flexible member 1004 can be coupled. In some examples, if the flexible member 1004 is a band, the flexible member 1004 can be looped over the tangs 1006A, 1006B. In other examples, if the flexible member 1004 is a discrete segment, the flexible member can be coupled to the tangs 1006A, 1006B in any other suitable manner, including via one or more fasteners, one or more knots, one or more chemical adhesives, etc. In some examples, one of the tangs 1006A, 1006B can be absent. In some such examples, both ends of the flexible member 1004 can be coupled to the remaining one of the tangs 1006A, 1006B and wrapped around a corresponding one of an example first boss 1008A and an example second boss 1008B, thereby similarly retaining the intermediate shaft 204 and assembly 1000.

The bosses 1008A, 1008B are coupled to a corresponding feature of another yoke of the corresponding U-joint (e.g., the second yoke 302B of FIGS. 3A and 3B of the U-joint 206 of FIGS. 2A and 1B, etc.). In the illustrated example of FIG. 10, the flexible member 1004 extends in front of the first boss 1008A, across the inner surface 806 of the first yoke 302A, and behind the second boss 1008B, etc. Accordingly, the first yoke 302A abuts the flexible member 1004. In the illustrated example of FIG. 10, the weight of the intermediate shaft 204 and the coupling of the flexible member 1004 to the tangs 1006A, 1006B causes the flexible member 1004 to be in tension and support the intermediate shaft 204 in the retained position 214. The flexible member 1004 is means for retaining (e.g., retaining means, etc.) the intermediate shaft 204 in the example retained position 214. To release the assembly 1000 from the retained position 214, the flexible member 1004 can be removed from one or both of the tangs 1006A, 1006B. Additionally or alternatively, the assembly 1000 can be released from the retained position 214 by severing (e.g., cutting, ripping, etc.) the flexible member 1004.

Figure 11:
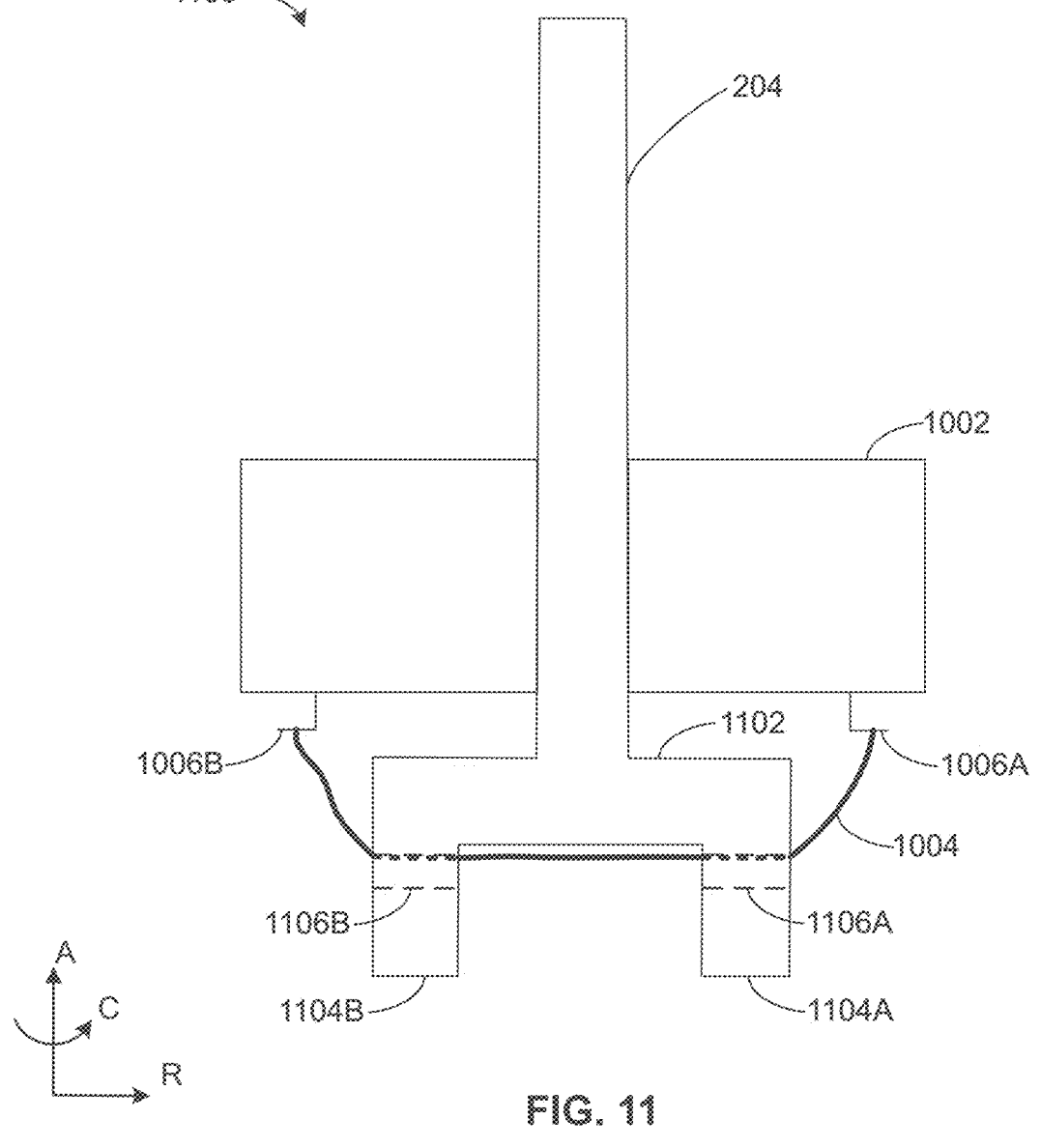
FIG. 11 is a schematic view of a steering shaft including a flexible member in a second configuration implemented in accordance with the teachings of this disclosure.

FIG. 11 is a schematic view of another example assembly 1100 including the intermediate shaft 204 of FIGS. 2A-3B, the example dash seal 1002 of FIG. 10, the example flexible member 1004 of FIG. 10, and the example tangs 1006A, 1006B. In the illustrated example of FIG. 10, the assembly 1100 includes an example yoke 1102 including an example first boss 1104A and an example second boss 1104B, similar to the first yoke 302A and bosses 1008A, 1008B of FIG. 10, except that the bosses 1104A, 1104B include an example first hole 1106A and an example second hole 1106B.

The example assembly 1100 is similar to the example assembly 1000 of FIG. 10, except the flexible member 1004 extends through the holes 1106A, 1106B. In some examples, the holes 1106A, 1106B can be the holes used to couple the corresponding yoke (e.g., the second yoke 306B, etc.) of a universal joint (e.g., the universal joint 206 of FIGS. 2A and 2B, etc.). In other examples, the holes 1106A, 1106B can be any other suitable holes. While the flexible member 1004 is depicted as extending through both of the holes 1106A, 1106B in FIG. 11, in other examples, the flexible member 1004 can extend through one of the holes 1106A, 1106B around the corresponding one of the bosses 1104A, 1104B to the corresponding one of the tangs 1006A, 1006B.

In the illustrated example of FIG. 11, the flexible member 1004 abuts the top surface of the holes 1106A, 1106B, which causes the flexible member 1004 to be in tension. In the illustrated example of FIG. 11, the weight of the intermediate shaft 204 and the coupling of the flexible member 1004 to the tangs 1006A, 1006B causes the flexible member 1004 to be in tension and supporting the intermediate shaft 204 in the retained position 214. The flexible member 1004 is means for retaining (e.g., retaining means, etc.) the intermediate shaft 204 in the example retained position 214. To release the assembly 1100 from the retained position 214, the flexible member 1004 can be removed from one or both of the tangs 1006A, 1006B. Additionally or alternatively, the assembly 1100 can be released from the retained position 214 by severing (e.g., cutting, ripping, etc.) the flexible member 1004.

Figure 12:
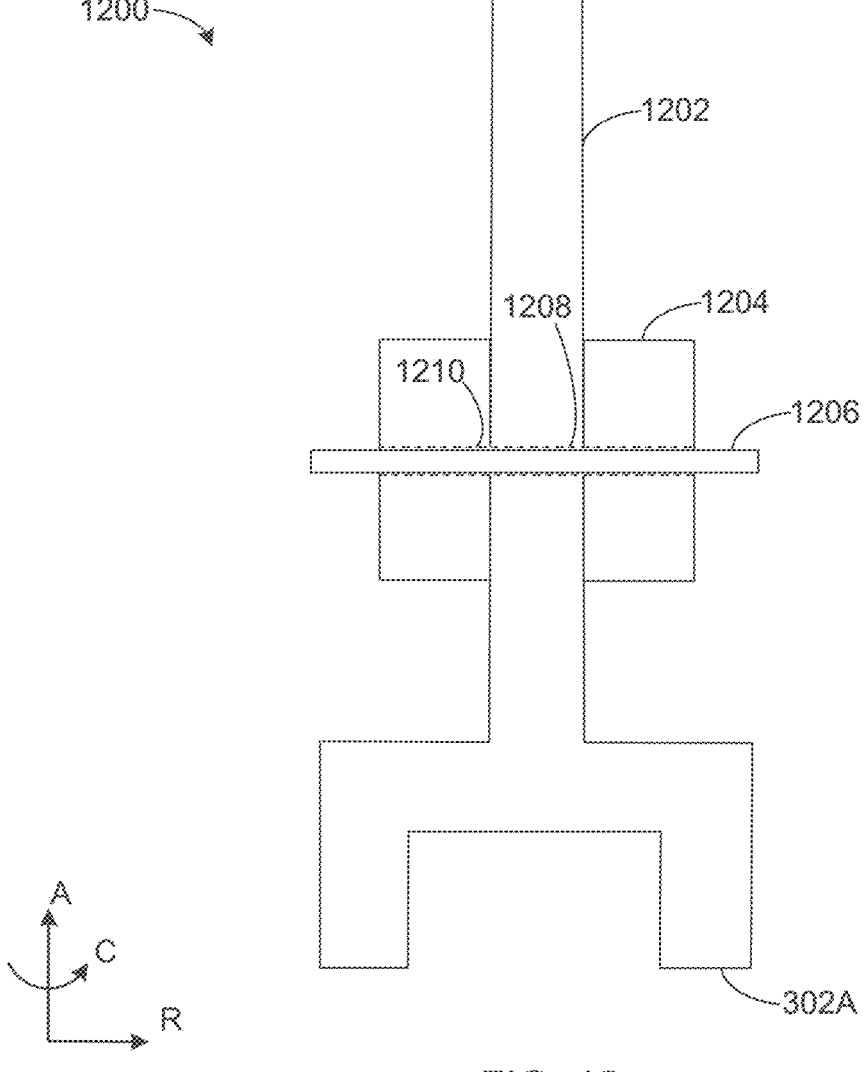
FIG. 12 is a schematic view of a steering shaft including an example pin coupling in a first configuration implemented in accordance with the teachings of this disclosure.

FIG. 12 is a schematic view of another example assembly 1200 implemented in accordance with the teachings of this disclosure. In the illustrated example of FIG. 12, the assembly 1200 includes an example intermediate shaft 1202, an example dash seal 1204, and an example pin 1206. In the illustrated example of FIG. 12, the example pin 1206 extends through an example first hole 1208 of the intermediate shaft 1202 and an example second hole 1210 of the dash seal 1204. The example intermediate shaft 1202 is similar to the intermediate shaft 204 of FIGS. 2A-3B, except that the intermediate shaft 1202 includes the first hole 1208 to receive the pin 1206. The example dash seal 1204 is similar to the dash seal 212 of FIGS. 2A-3B, except that the dash seal 1204 includes the second hole 1210 to receive the pin 1206. In the illustrated example of FIG. 12, the first hole 1208 and the second hole 1210 have the same width (e.g., diameter, etc.). In other examples, the first hole 1208 and the second hole 1210 can have different sizes (e.g., the first hole 1208 can have a larger diameter than the second hole 1210, the second hole 1210 can have a larger diameter than the first hole 1208, etc.).

The pin 1206 is a mechanical member that supports the intermediate shaft 1202. The pin 1206 can be composed of a metal (e.g., steel, aluminum, copper, brass, iron, etc.), a rigid plastic (e.g., polylactic acid, polyethylene, polystyrene, polyvinyl chloride, etc.), a natural material (e.g., wooden dowel, etc.), and/or any other suitable material or combination thereof. In the illustrated example of FIG. 12, the pin 1206 is longer than the width of the dash seal 1204 and intermediate shaft 1202 (e.g., the pin 1206 extends radially from both ends of the second hole 1210, etc.). In other examples, the pin 1206 can be shorter than the width of the dash seal 1204. In the illustrated example of FIG. 12, the interface between the pin 1206, the first hole 1208 of the intermediate shaft 1202, and the second hole 1210 of the dash seal 1204 cause the weight of the intermediate shaft 1202 to be reacted by the interface between the pin 1206 and the second hole 1210. In the illustrated example of FIG. 12, the weight of the intermediate shaft 1202 and the reaction of such weight by the pin 1206 causes a shear stress to be applied to the pin 1206. In some examples, the pin 1206 can include features (e.g., a ring, a handle, etc.) to facilitate the removal of the pin 1206. In some examples, the pin 1206 can have a smaller diameter (e.g., 5% smaller, 10% smaller, 25% smaller, etc.) than the holes 1208, 1210 to facilitate the removal of the pin 1206 after the decking of the steering gear (e.g., the steering gear 202 of FIG. 2, etc.).

The pin 1206 and/or holes 1208, 1210 are means for retaining (e.g., retaining means, etc.) the intermediate shaft 1202 in the example retained position 214 of FIGS. 2A and 3A. To release the assembly 1200 from the retained position 214, the pin 1206 can be removed from the holes 1208, 1210. While one pin is depicted in FIG. 12 (e.g., the pin 1206, etc.), in other examples, the assembly 1200 can include multiple pins (e.g., 2 pins, 3 pins, 4 pins, etc.) with corresponding holes in the intermediate shaft 1202 and/or dash seal 1204. In some such examples, each of the multiple pins can be removed to release the assembly 1200 from the retained position 214.

Figure 13:
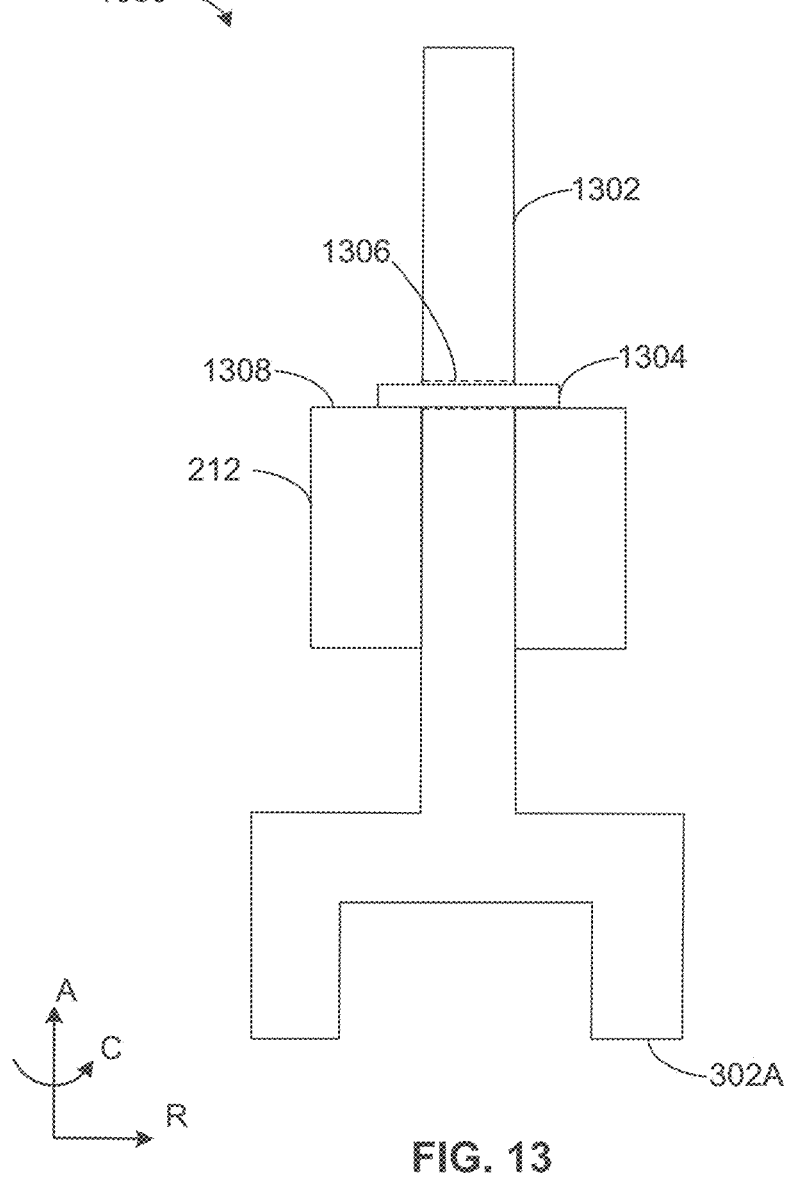
FIG. 13 is a schematic view of a steering shaft including an example pin coupling in a second configuration implemented in accordance with the teachings of this disclosure.

FIG. 13 is a schematic view of another example assembly 1300 implemented in accordance with the teachings of this disclosure. In the illustrated example of FIG. 13, the assembly 1300 includes an example intermediate shaft 1302, the example dash seal 212 of FIGS. 2A-3B, and an example pin 1304. In the illustrated example of FIG. 13, the example pin 1304 extends through an example first hole 1306 of the intermediate shaft 1302. The example intermediate shaft 1302 is similar to the intermediate shaft 204 of FIGS. 2A-3B, except that the intermediate shaft 1302 includes the first hole 1306 to receive the pin 1304.

The pin 1304 is a mechanical member that supports the intermediate shaft 1302. The pin 1304 can be composed of a metal (e.g., steel, aluminum, copper, brass, iron, etc.), a rigid plastic (e.g., polylactic acid, polyethylene, polystyrene, polyvinyl chloride, etc.), a natural material (e.g., wooden dowel, etc.), and/or any other suitable material or combination thereof. In the illustrated example of FIG. 13, the pin 1304 is longer than the width of intermediate shaft 1302, such that the pin 1304 extends through the hole 1306 and abuts an example top surface 1308 of the dash seal 212. In the illustrated example of FIG. 13, the interface between the pin 1304, the hole 1306 of the intermediate shaft 1302, and the top surface 1308 of the dash seal causes the weight of the intermediate shaft 1302 to be reacted by the interface between the pin 1304 and the hole 1306. In the illustrated example of FIG. 13, the weight of the intermediate shaft 1302 and the reaction of such weight by the pin 1304 causes a shear stress to be applied to the pin 1304. In some examples, the pin 1304 can include features (e.g., a ring, a handle, etc.) to facilitate the removal of the pin 1304. In some examples, the pin 1304 can have a smaller diameter (e.g., 5% smaller, 10% smaller, 25% smaller, etc.) that the hole 1306 to facilitate the removal of the pin 1304 after the decking of the steering gear (e.g., the steering gear 202 of FIG. 2, etc.). The pin 1304 and/or hole 1306 are means for retaining (e.g., retaining means, etc.) the intermediate shaft 1302 in the example retained position 214 of FIGS. 2A and 3A. To release the assembly 1300 from the retained position 214, the pin 1304 can be removed from the hole 1306.

Example methods, apparatus, systems, and articles of manufacture for retaining a steering shaft are disclosed herein. Further examples and combinations thereof include the following:

Example 1 includes an apparatus comprising a seal, a steering shaft extending through the seal, and means for retaining the steering shaft in a retained position relative to the seal, the means for retaining configured to be release the steering shaft to an assembled position.

Example 2 includes the apparatus of example 1, wherein the seal is a dash seal.

Example 3 includes the apparatus of example 1, wherein the assembled position includes an interface between an end of the steering shaft and a steering gear.

Example 4 includes the apparatus of example 1, wherein the means for retaining includes a retention slot on the seal, and a boss extending from the steering shaft, the retention slot and the boss forming a bayonet interface in the retained position.

Example 5 includes the apparatus of example 1, wherein the means for retaining includes a tapered surface of the steering shaft, the tapered surface forming an interference fit with the seal in the retained position.

Example 6 includes the apparatus of example 1, wherein the means for retaining includes a first flange formed on the steering shaft and a second flange formed on the seal, the first flange abutting the second flange in the retained position.

Example 7 includes the apparatus of example 1, wherein the means for retaining includes a bracket including a first end and a second end, the first end coupled to the seal in the retained position, and the second end coupled to the steering shaft in the retained position.

Example 8 includes the apparatus of example 1, wherein the means for retaining includes a flexible member extending between a first location on the seal and a second location on the seal, the flexible member abutting the steering shaft, the abutment of the flexible member and the steering shaft retaining the steering shaft in the retained position.

Example 9 includes the apparatus of example 1, wherein the means for retaining includes a first hole in the steering shaft, and a pin extending through the first hole.

Example 10 includes the apparatus of example 9, wherein the means for retaining further includes a second hole in the seal, the pin extending through the second hole.

Example 11 includes a vehicle including a first compartment, a second compartment, a panel separating the first compartment from the second compartment, and an assembly including at least one retention feature, a seal coupled within a hole of the panel, and a steering shaft extending through the seal, the steering shaft movable between a first position relative to the seal and a second position relative to the seal, the steering shaft retainable in the first position via the at least one retention feature, the first position having a first length of the steering shaft in the first compartment, the second position having a second length in the second compartment, the first length different that the second length.

Example 12 includes the vehicle of example 11, wherein the first compartment is a passenger compartment, and the second compartment is a front component compartment.

Example 13 includes the vehicle of example 11, wherein the panel is a dash panel and the seal is a dash seal.

Example 14 includes the vehicle of example 11, further including a steering gear, an input shaft coupled to the steering gear, and a joint coupled to an end of the steering shaft, the first position enabling a coupling of the steering gear to the vehicle, the second position enabling a coupling of the joint to the input shaft.

Example 15 includes the vehicle of example 11, wherein the at least one retention feature includes a retention slot formed on the seal, and a pin extending from the steering shaft, the retention slot and the pin forming a bayonet interface in the first position.

Example 16 includes the vehicle of example 11, wherein the at least one retention feature includes a tapered surface of the steering shaft, the tapered surface to form an interference fit with the seal in the first position.

Example 17 includes the vehicle of example 11, wherein the at least one retention feature includes a first flange formed on the steering shaft, and a second flange formed on the seal, the first flange abutting the second flange in the first position.

Example 18 includes the vehicle of example 11, wherein the at least one retention feature includes a bracket including a first arm and a second arm, the first arm coupled to the seal in the first position, and the second arm coupled to the steering shaft in the first position.

Example 19 includes the vehicle of example 11, wherein the at least one retention feature includes flexible member extending between a first location on the seal and a second location on the seal, the flexible member to retain the steering shaft in the first position.

Example 20 includes the vehicle of example 11, wherein the at least one retention feature includes a hole in the steering shaft, and a pin extending through the hole, the pin to retain the steering shaft in the first position.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. An apparatus comprising:
   a steering shaft; and
   a seal surrounding the steering shaft, the steering shaft extending through the seal, the steering shaft having a retained position and an assembled position relative to the seal, the assembled position axially displaced from the retained position, the seal to form an interference fit with a portion of the steering shaft when the steering shaft is in the retained position, the seal spaced apart from the portion of the steering shaft when the steering shaft is in the assembled position.

2. The apparatus of claim 1, wherein the seal is an elastic seal.

3. The apparatus of claim 1, wherein the portion has a tapered profile.

4. The apparatus of claim 3, wherein the steering shaft includes a yoke, the portion of the steering shaft abuts the yoke.

5. The apparatus of claim 4, wherein the yoke is to form a universal joint with an input shaft of a steering gear.

6. The apparatus of claim 1, wherein the seal is a dash seal.

7. The apparatus of claim 1, wherein the seal is a floor seal.

8. An assembly including:
   a panel to separate a first vehicle compartment from a second vehicle compartment, the panel including an opening;
   a seal in the opening; and
   a steering shaft extending through the panel, the seal surrounding the steering shaft, the steering shaft movable between a first axial position relative to the panel and a second axial position relative to the panel, the steering shaft retainable in the first axial position via an interference fit formed between the seal and a portion of the steering shaft when the steering shaft is in the first axial position, the seal spaced apart from the portion of the steering shaft when the steering shaft is in the second axial position.

9. The assembly of claim 8, wherein the seal is an elastic seal.

10. The assembly of claim 8, wherein the portion of the steering shaft has a tapered profile.

11. The assembly of claim 10, wherein the steering shaft includes a yoke and the portion of the steering shaft is spaced from the yoke.

12. The assembly of claim 11, wherein the yoke is to form a universal joint with an input shaft of a steering gear.

13. The assembly of claim 8, wherein the panel is a dash panel.

14. A vehicle including:
a first compartment;
a second compartment;
an assembly including:
a panel to separate the first compartment from the second compartment, the panel including an opening;
a seal in the opening; and a steering shaft extending through the panel, the seal surrounding the steering shaft, the steering shaft movable between a first axial position relative to the panel and a second axial position relative to the panel, the steering shaft retainable in the first axial position via a press fit formed between the seal and a portion of the steering shaft when the steering shaft is in the first axial position, the seal spaced apart from the portion of the steering shaft when the steering shaft is in the second axial position.

15. The vehicle of claim 14, wherein the first compartment is a passenger compartment, and the second compartment is a front component compartment.

16. The vehicle of claim 14, wherein the seal is an elastic seal.

17. The vehicle of claim 14, wherein the panel is a dash panel and the seal is a dash seal.

18. The vehicle of claim 14, wherein the portion of the steering shaft has a tapered profile.

19. The vehicle of claim 18, wherein the steering shaft includes a yoke and the portion of the steering shaft abuts the yoke.

20. The vehicle of claim 14, wherein the seal is a floor seal.

* * * * *